US008908773B2

(12) United States Patent
Citta et al.

(10) Patent No.: US 8,908,773 B2
(45) Date of Patent: Dec. 9, 2014

(54) APPARATUS AND METHOD FOR ENCODING AND DECODING SIGNALS

(75) Inventors: Richard W. Citta, Oak Park, IL (US); Barth Alan Canfield, Indianapolis, IN (US); David Emery Virag, Noblesville, IN (US)

(73) Assignee: Thomson Licensing, Issy-les-Moulineaux, Cedex (FR)

( * ) Notice: Subject to any disclaimer, the term of this patent is extended or adjusted under 35 U.S.C. 154(b) by 566 days.

(21) Appl. No.: 12/682,985

(22) PCT Filed: Oct. 14, 2008

(86) PCT No.: PCT/US2008/011705
§ 371 (c)(1),
(2), (4) Date: Apr. 14, 2010

(87) PCT Pub. No.: WO2009/051687
PCT Pub. Date: Apr. 23, 2009

(65) Prior Publication Data
US 2010/0226443 A1    Sep. 9, 2010

Related U.S. Application Data

(60) Provisional application No. 60/999,040, filed on Oct. 15, 2007, provisional application No. 60/998,961, filed on Oct. 15, 2007, provisional application No. 60/999,040, filed on Oct. 15, 2007.

(51) Int. Cl.
*H04N 7/26* (2006.01)
*H04L 27/00* (2006.01)
(Continued)

(52) U.S. Cl.
CPC ........ *H04N 21/64315* (2013.01); *H04L 1/0071* (2013.01); *H04N 21/6131* (2013.01);
(Continued)

(58) Field of Classification Search
CPC .................... H04N 21/4348; H04N 21/23614; H04N 21/4345; H04N 13/0066

USPC .................... 348/470, 384.1, 426.1, 43, 731, 348/E13.001; 375/357; 370/912
See application file for complete search history.

(56) References Cited

U.S. PATENT DOCUMENTS 3,652,998 A    3/1972   Forney, Jr.
3,873,920 A    3/1975   Apple et al.
(Continued)

FOREIGN PATENT DOCUMENTS

CA    2534435    3/2005
CN    1575549    2/2005
(Continued)

OTHER PUBLICATIONS

Search Report did Nov. 19, 2009.
(Continued)

*Primary Examiner* — Joseph Ustaris
*Assistant Examiner* — William Adrovel
(74) *Attorney, Agent, or Firm* — Robert D. Shedd; Vincent E. Duffy; Michael A. Pugel

(57) ABSTRACT

New capabilities will allow conventional broadcast transmission to be available to mobile devices. The present embodiments describe an apparatus and method for encoding and decoding signals. A method includes the steps of generating data blocks, encoding a first set of data blocks using a first encoding rate, encoding a second set of data blocks using a second encoding rate, and generating a control packet, the control packet identifying the first set of data blocks and the first encoding rate, and identifying the second set of data blocks and the second encoding rate. An apparatus includes a first decoder receiving data and decoding a first subset of the data, including a control packet, at a first decoding rate and a controller controlling the operation of the first decoder based on the decoded control packet.

5 Claims, 11 Drawing Sheets

(51) Int. Cl.
*H04N 21/61* (2011.01)
*H04N 21/438* (2011.01)
*H04N 21/6336* (2011.01)
*H04N 21/236* (2011.01)
*H04N 21/2383* (2011.01)
*H04N 21/2381* (2011.01)
*H04N 21/2343* (2011.01)
*H04N 21/2662* (2011.01)
*H04N 21/643* (2011.01)
*H04L 1/00* (2006.01)

(52) U.S. Cl.
CPC ....... *H04N 21/4382* (2013.01); *H04N 21/6336* (2013.01); *H04N 21/23608* (2013.01); *H04L 1/007* (2013.01); *H04N 21/2383* (2013.01); *H04N 21/2381* (2013.01); *H04N 21/234327* (2013.01); *H04L 2001/0093* (2013.01); *H04N 21/23439* (2013.01); *H04L 1/0028* (2013.01); *H04N 21/2662* (2013.01); *H04L 1/0065* (2013.01)
USPC ..................... 375/240.26; 375/340

(56) References Cited

U.S. PATENT DOCUMENTS

| | | |
|---|---|---|
| 4,677,625 A | 6/1987 | Betts et al. |
| 4,881,223 A | 11/1989 | Debuysscher |
| 5,012,491 A | 4/1991 | Iwasaki |
| 5,050,164 A | 9/1991 | Chao |
| 5,087,975 A | 2/1992 | Citta |
| 5,353,313 A | 10/1994 | Honea |
| 5,369,641 A | 11/1994 | Dodt et al. |
| 5,398,073 A | 3/1995 | Wei |
| 5,438,369 A | 8/1995 | Citta et al. |
| 5,452,009 A | 9/1995 | Citta |
| 5,534,938 A | 7/1996 | Citta et al. |
| 5,572,532 A | 11/1996 | Fimoff et al. |
| 5,600,677 A | 2/1997 | Citta et al. |
| 5,629,958 A | 5/1997 | Willming |
| 5,636,251 A | 6/1997 | Citta et al. |
| 5,687,182 A | 11/1997 | Shikakura |
| 5,809,242 A | 9/1998 | Shaw et al. |
| 5,978,855 A | 11/1999 | Metz et al. |
| 6,072,810 A | 6/2000 | Van Der Puttel et al. |
| 6,079,041 A | 6/2000 | Kunisa et al. |
| 6,407,993 B1* | 6/2002 | Moulsley ............... 370/347 |
| 6,493,402 B1 | 12/2002 | Fimoff |
| 6,559,894 B2 | 5/2003 | Omura et al. |
| 6,563,436 B2 | 5/2003 | Fimoff et al. |
| 6,614,847 B1 | 9/2003 | Das et al. |
| 6,625,775 B1 | 9/2003 | Kim |
| 6,687,310 B1 | 2/2004 | Fimoff et al. |
| 6,714,563 B1 | 3/2004 | Kushi |
| 6,721,771 B1 | 4/2004 | Chang |
| 6,725,411 B1 | 4/2004 | Gerlach et al. |
| 6,734,920 B2 | 5/2004 | Ghosh et al. |
| 6,754,170 B1 | 6/2004 | Ward |
| 6,762,698 B2 | 7/2004 | Bretl et al. |
| 6,765,508 B2 | 7/2004 | Bretl et al. |
| 6,771,197 B1 | 8/2004 | Yedidia et al. |
| 6,772,184 B2 | 8/2004 | Chang |
| 6,806,816 B2 | 10/2004 | Fimoff |
| 6,823,489 B2 | 11/2004 | Wittig et al. |
| 6,851,085 B2 | 2/2005 | Kim et al. |
| 6,861,964 B2 | 3/2005 | Breti et al. |
| 6,865,712 B2 | 3/2005 | Becker et al. |
| 6,924,753 B2 | 8/2005 | Bretl et al. |
| 6,985,092 B2 | 1/2006 | Bretl et al. |
| 6,987,543 B1 | 1/2006 | Mogre et al. |
| 6,996,133 B2 | 2/2006 | Bretl et al. |
| 7,006,566 B2 | 2/2006 | Birru |
| 7,016,409 B2* | 3/2006 | Unger ............... 375/240.02 |
| 7,042,908 B1 | 5/2006 | Mayer |
| 7,042,949 B1 | 5/2006 | Omura et al. |
| 7,046,694 B2 | 5/2006 | Kumar |
| 7,085,324 B2 | 8/2006 | Choi et al. |
| 7,110,048 B2 | 9/2006 | Wiess |
| 7,187,698 B2 | 3/2007 | Bretl et al. |
| 7,194,047 B2 | 3/2007 | Strolle et al. |
| 7,197,685 B2 | 3/2007 | Limberg |
| 7,203,165 B1 | 4/2007 | Kowalewski |
| 7,215,714 B2 | 5/2007 | Bretl et al. |
| 7,337,386 B2 | 2/2008 | Chang et al. |
| 7,346,107 B2 | 3/2008 | Choi et al. |
| 7,620,074 B2 | 11/2009 | Yasuda et al. |
| 7,675,994 B2 | 3/2010 | Gaddam et al. |
| 7,712,011 B2 | 5/2010 | Kim et al. |
| 7,715,491 B2 | 5/2010 | Yu et al. |
| 7,860,128 B2 | 12/2010 | Niu et al. |
| 7,933,365 B2 | 4/2011 | Choi et al. |
| 7,983,354 B2 | 7/2011 | Park et al. |
| 8,054,842 B2 | 11/2011 | De Herr et al. |
| 8,094,727 B2 | 1/2012 | Hong et al. |
| 8,149,939 B2 | 4/2012 | Limberg |
| 8,151,174 B2 | 4/2012 | Betts |
| 8,374,126 B2 | 2/2013 | Kitaji et al. |
| 8,495,695 B2 | 7/2013 | Kim et al. |
| 2001/0024457 A1 | 9/2001 | Barry et al. |
| 2001/0050926 A1 | 12/2001 | Kumar |
| 2001/0055342 A1* | 12/2001 | Fimoff ............... 375/240.26 |
| 2002/0027947 A1 | 3/2002 | Kanterakis et al. |
| 2002/0040460 A1 | 4/2002 | Choi et al. |
| 2002/0053049 A1 | 5/2002 | Shiomoto et al. |
| 2002/0054634 A1 | 5/2002 | Martin et al. |
| 2002/0154247 A1 | 10/2002 | Ghosh et al. |
| 2002/0154248 A1 | 10/2002 | Wittig et al. |
| 2002/0172275 A1 | 11/2002 | Birru |
| 2002/0181581 A1 | 12/2002 | Birru et al. |
| 2002/0191712 A1 | 12/2002 | Gaddam et al. |
| 2002/0194570 A1 | 12/2002 | Birru et al. |
| 2003/0012290 A1 | 1/2003 | Fimoff et al. |
| 2003/0021341 A1 | 1/2003 | Vigil et al. |
| 2003/0039318 A1 | 2/2003 | Tong et al. |
| 2003/0041256 A1 | 2/2003 | Wee et al. |
| 2003/0081692 A1 | 5/2003 | Kwan et al. |
| 2003/0099303 A1 | 5/2003 | Birru et al. |
| 2003/0103575 A1 | 6/2003 | Birru et al. |
| 2003/0108129 A1 | 6/2003 | Voglewede et al. |
| 2003/0112879 A1 | 6/2003 | Antia et al. |
| 2003/0128746 A1 | 7/2003 | Lerner et al. |
| 2003/0140345 A1 | 7/2003 | Fisk et al. |
| 2003/0154441 A1 | 8/2003 | Nieminen |
| 2003/0227906 A1 | 12/2003 | Hallman |
| 2003/0227913 A1 | 12/2003 | Hallman et al. |
| 2003/0227943 A1 | 12/2003 | Hallman |
| 2004/0047367 A1 | 3/2004 | Mammen |
| 2004/0090997 A1 | 5/2004 | Choi et al. |
| 2005/0018691 A1 | 1/2005 | Riedl et al. |
| 2005/0059436 A1 | 3/2005 | Addy et al. |
| 2005/0138521 A1 | 6/2005 | Suzuki et al. |
| 2005/0152411 A1 | 7/2005 | Breti et al. |
| 2005/0160347 A1 | 7/2005 | Kim et al. |
| 2005/0180369 A1 | 8/2005 | Hansen et al. |
| 2005/0184887 A1 | 8/2005 | Jaffe et al. |
| 2005/0193408 A1 | 9/2005 | Sull et al. |
| 2005/0193425 A1 | 9/2005 | Sull et al. |
| 2005/0203927 A1 | 9/2005 | Sull et al. |
| 2005/0204385 A1 | 9/2005 | Sull et al. |
| 2005/0210145 A1 | 9/2005 | Kim et al. |
| 2005/0276259 A1 | 12/2005 | Nakabayashi et al. |
| 2006/0064716 A1 | 3/2006 | Sull et al. |
| 2006/0104348 A1 | 5/2006 | Chen et al. |
| 2006/0212782 A1 | 9/2006 | Li |
| 2006/0212902 A1 | 9/2006 | Seo et al. |
| 2006/0246836 A1 | 11/2006 | Simon |
| 2006/0253890 A9 | 11/2006 | Park et al. |
| 2007/0002871 A1 | 1/2007 | Pekonen et al. |
| 2007/0025450 A1 | 2/2007 | Jin |
| 2007/0076584 A1 | 4/2007 | Kim et al. |
| 2007/0076586 A1 | 4/2007 | Kim et al. |
| 2007/0094567 A1 | 4/2007 | Park et al. |
| 2007/0116152 A1* | 5/2007 | Thesling ............... 375/326 |

(56) References Cited

U.S. PATENT DOCUMENTS

| | | |
|---|---|---|
| 2007/0140271 A1 | 6/2007 | Amante et al. |
| 2007/0140369 A1 | 6/2007 | Limberg |
| 2007/0153914 A1 | 7/2007 | Hannuksela et al. |
| 2007/0168844 A1 | 7/2007 | Jeong et al. |
| 2007/0183525 A1 | 8/2007 | Park et al. |
| 2007/0195889 A1 | 8/2007 | Hong et al. |
| 2007/0211661 A1 | 9/2007 | Tee et al. |
| 2007/0211671 A1 | 9/2007 | Cha |
| 2007/0211769 A1 | 9/2007 | Lee et al. |
| 2007/0230564 A1 | 10/2007 | Chen et al. |
| 2007/0230607 A1 | 10/2007 | Yu et al. |
| 2007/0256001 A1 | 11/2007 | Suzuki et al. |
| 2007/0277210 A1 | 11/2007 | Yousef |
| 2008/0002765 A1 | 1/2008 | Song et al. |
| 2008/0101493 A1 | 5/2008 | Niu et al. |
| 2008/0112502 A1 | 5/2008 | Limberg |
| 2009/0044230 A1* | 2/2009 | Oh et al. ................ 725/62 |
| 2009/0128711 A1 | 5/2009 | Kim et al. |
| 2010/0232495 A1 | 9/2010 | Citta et al. |
| 2010/0238995 A1 | 9/2010 | Citta et al. |
| 2010/0246663 A1 | 9/2010 | Citta et al. |
| 2010/0246664 A1 | 9/2010 | Citta et al. |
| 2010/0329328 A1 | 12/2010 | Kontola et al. |

FOREIGN PATENT DOCUMENTS

| | | |
|---|---|---|
| CN | 1757190 | 4/2006 |
| EP | 0822722 | 2/1998 |
| EP | 0853407 | 7/1998 |
| EP | 0999709 | 5/2000 |
| EP | 1237319 | 9/2002 |
| EP | 1276288 | 1/2003 |
| EP | 1 437 910 A | 7/2004 |
| EP | 1528702 | 5/2005 |
| EP | 1533727 | 5/2005 |
| EP | 1 657 835 A | 5/2006 |
| EP | 1 693 981 A | 8/2006 |
| JP | 11196072 | 7/1999 |
| JP | 2001274774 | 10/2001 |
| JP | 200432467 | 1/2004 |
| JP | 2004328356 | 11/2004 |
| JP | 2005328334 | 11/2005 |
| JP | 2005328397 | 11/2005 |
| JP | 2007214856 | 8/2007 |
| KR | 100277764 | 1/2001 |
| KR | 1020020027293 | 4/2002 |
| WO | WO 98/51111 A | 11/1998 |
| WO | WO0018055 | 3/2000 |
| WO | WO0035136 | 6/2000 |
| WO | WO0221784 | 3/2002 |
| WO | WO02100026 | 12/2002 |
| WO | WO2004015998 | 2/2004 |
| WO | WO2004023818 | 3/2004 |
| WO | WO2005020576 | 3/2005 |
| WO | WO2005115001 | 12/2005 |
| WO | WO2005122574 | 12/2005 |
| WO | WO 2006/104519 A | 10/2006 |
| WO | WO2006126841 | 11/2006 |
| WO | WO2007/024275 | 3/2007 |
| WO | WO2007046674 | 4/2007 |
| WO | WO2007099978 | 7/2007 |
| WO | WO2008014522 | 1/2008 |
| WO | WO2008144001 | 11/2008 |
| WO | WO2008144002 | 11/2008 |
| WO | WO2008144003 | 11/2008 |
| WO | WO2008144004 | 11/2008 |
| WO | WO2008144005 | 11/2008 |

OTHER PUBLICATIONS

Richer et al., "The ATSC Digital Television System," Proceedings of the IEEE, vol. 94, No. 1, Jan. 2006, pp. 37-43.

ATSC STD., "A/53: ATSC Digital Television Standard, Parts 1-6, 2007," Advanced Television Systems Committee, Inc., Jan. 3, 2007, 136 pages.

"ATSC Digital Television Standard, Doc. A/53," ATSC Digital Television Standard, Apr. 12, 1995, pp. 1-74.

"ATSC Digital Television Standard Part 2" RF/Transmission System Characteritics (A/53, Part 2:2007 Internet Article.

ATSC "ATSC Recommended Practice: Program and System Information Protocol Implementation Guidelines for Broadcasters, "ATSC, Jun. 25, 2002, pp. 1-44.

ATSC "ATSC Recommended Practice: Program and System Information Protocol Implementation Guidelines for Broadcasters, "ATSC, Jun. 25, 2002, pp. 45-93.

Clark et al., "Error Correction Coding for Digital Communications", Chapter 2, Group Code pp. 50-61.

DAVIC, "Lower Layer Protocols and Physical Interfaces", Digital Audio-Visual Council, DAVIC 1.3.1 Specification Part 8, 1998.

Delay, "Broadband Data Delivery Over Television Networks", Digital and Computational Video, Proceedings, Feb. 8-9, 2001, Piscataway, NJ, pp. 36-43.

ETSI: "DVB-H Implementation Guidelines," DVB BlueBook Document A092 Rev. 2, May 2007, Internet Citation retrieved May 31, 2007, pp. 17-22.

Park et al.:"Supplementary Reference Sequece VSB System," IEEE, 3.2-2, 2007.

ISO/IEC "Transport Stream Packet Layer", ISO/IEC 13818-1, ITU-T Rec. H.222.0, 1996.

Jacobsmeyer, "Introduction to Error-Control Coding", Pericle Communications Col, Internet Article.

Kratochvil et al., "DVB-H Standard and Testing of its Mobile Terminals," Radioelektronika, 17th International Conference, Brno, Czech Republic, Apr. 24-25, 2007, IEEE Apr. 24, 2007, pp. 292-296.

Lehtoranta et al.:"Detecting Corrupted Intra Macroblocks in H.263 Video,"IEEE, 2002, pp. 33-36.

Max, OFDM-UWB Physical Layer Emulation for Event-Based MAC Simulation, 17th Annual IEEE International Symposium (PIMRC'06), pp. 1-6.

Roweis, "Equivalent Codes & Systematic Forms", Internet Article, Nov. 9, 2005.

Seshadri et al., "Channel Coding for Cochannel Interference Suppression in Wireless Communication Systems", Internet Article, Retrieved on Sep. 9, 2008.

Simpson, "Video Over IP, A Practical Guide to Technology and Applications", Elsevier-Focal Press, 2006, pp. 259-265.

Sun et al.:"Global Motion Vector Coding (GMVC),"ITU-Telecommunication Standardization Sector, doc. VCEG-020, Dec. 4, 2001, pp. 1-6.

Tang et al., "Viterbi Decoder for High-Speed Ultra-Wideband Communication Systems", ICASSP 2005, 2005 IEEE.

3rd Generation Partnership Project (3GPP); Telechnical Specification Group Radio Access Network Multiplexing and Channel Coding (FDD) Oct. 1, 1999 (pp. 12&13).

De Castro, Fernando CC, et al. "8-VSB channel coding analysis for DTV broadcast." Consumer Electronics, IEEE Transactions on 46.3 (2000): 539-547.

* cited by examiner

APPARATUS AND METHOD FOR ENCODING AND DECODING SIGNALS

CROSS REFERENCE TO RELATED APPLICATIONS

This application claims the benefit under 35 U.S.C. §365 of International Application PCT/US2008/011705, filed Oct. 14, 2008, which was published in accordance with PCT article 21(2) on Apr. 23, 2009, in English and which claims the benefit under 35 U.S.C. §119 of a provisional application 60/999,040 filed in the United States on Oct. 15, 2007.

This application is related to the following co-pending, commonly owned, U.S. and International Patent Applications: (1) Ser. No. 12/599,355 entitled APPARATUS AND METHOD FOR ENCODING AND DECODING SIGNALS filed on May 16, 2008 as an international patent application (Filing No. PCT/US08/006334); (2) No. PCT/US08/006335 entitled APPARATUS AND METHOD FOR ENCODING AND DECODING SIGNALS filed on May 16, 2008; (3) Ser. No. 12/599,391 entitled APPARATUS AND METHOD FOR ENCODING AND DECODING SIGNALS filed on May 16, 2008 as an international patent application (Filing No. PCT/US08/006333); (4) Ser. No. 12/599,734 entitled APPARATUS AND METHOD FOR ENCODING AND DECODING SIGNALS filed on May 16, 2008 as an international patent application (Filing No. PCT/US08/006332); (5) Ser. No. 12/599,757 entitled APPARATUS AND METHOD FOR ENCODING AND DECODING SIGNALS filed on May 16, 2008 as an international patent application (Filing No. PCT/US08/006331); (6) Ser. No. 12/734,149 entitled APPARATUS AND METHOD FOR ENCODING AND DECODING SIGNALS filed on Oct. 14, 2008 as an international patent application (Filing No. PCT/US08/011709); (7) Ser. No. 12/733,961 entitled CODE RATE IDENTIFIER IN PSUEDORANDOM SEQUENCE IN ATSC SIGNAL filed on Oct. 14, 2008 as an international patent application (Filing No. PCT/US08/011707); and (8) Ser. No. 12/734,154 entitled PREAMBLE FOR A DIGITAL TELEVISION SYSTEM filed on Oct. 14, 2008 as an international patent application (Filing No. PCT/US08/011711).

FIELD OF THE INVENTION

The present disclosure relates generally to the operation of a digital broadcast system and more specifically to the encoding and decoding of data for broadcast television that is intended for use by mobile, pedestrian and personal devices.

BACKGROUND OF THE INVENTION

This section is intended to introduce the reader to various aspects of art, which may be related to various aspects of the present invention that are described below. This discussion is believed to be helpful in providing the reader with background information to facilitate a better understanding of the various aspects of the present invention. Accordingly, it should be understood that these statements are to be read in this light, and not as admissions of prior art.

Television broadcast systems throughout the world have migrated from the delivery of analog audio and video signals to modern digital communications systems. For example, in the United States, the Advanced Television Standards Committee (ATSC) has developed a standard called "ATSC Standard: Digital Television Standard A/53" (the A53 standard). The A53 standard defines how data for digital television broadcasts should be encoded and decoded. In addition, the U.S. Federal Communications Commission (FCC) has allocated portions of the electromagnetic spectrum for television broadcasts. The FCC assigns a contiguous 6 MHz channel within the allocated portion to a broadcaster for transmission of terrestrial (i.e., not cable or satellite) digital television broadcasts. Each 6 MHz channel has a channel capacity of approximately 19 Mb/second based on the encoding and modulation format in the A53 standard. Furthermore, the FCC has mandated that transmissions of terrestrial digital television data through the 6 MHz channel must comply with the A53 standard.

Digital broadcast signal transmission standards, such as the A53 standard, define how source data (e.g., digital audio and video data) should be processed and modulated into a signal that is transmitted through the channel. The processing adds redundant information to the source data so that a receiver that receives the signal from the channel may recover the source data even if the channel adds noise and multi-path interference to the transmitted signal. The redundant information added to the source data reduces the effective data rate at which the source data is transmitted but increases the potential for successful recovery of the source data from the transmitted signal.

The A53 standard development process was focused on high definition television (HDTV) and fixed reception. The system was designed to maximize video bit rate for the large high resolution television screens that were already beginning to enter the market. Transmissions broadcast under the ATSC A/53 standard, however, present difficulties for mobile receivers. Enhancements to the standard are required for robust reception of digital television signals by mobile devices.

The FCC requires that broadcasters must use the A53 standard to encode data generated for broadcast transmission. If the transmission of a digital television program broadcast does not require the entire 19 Mb/second capacity of the allocated channel, the broadcaster may use any excess capacity to broadcast other services, possibly even to devices such as portable receivers and cellular telephones. However, the FCC requires that any data transmitted to such other devices using the excess capacity must be transmitted in accordance with the A53 standard. Revision of the A53 standard is possible and is contemplated by the ATSC, however the evolution must occur such that that existing, or so-called legacy, digital television receivers may continue to be used. Similarly, encoding and transmission of signals in accordance with the existing A53 standard may be referred to as legacy encoding and transmission.

Recognizing this fact, in 2007, the ATSC announced the launch of a process to develop a standard that would enable broadcasters to deliver television content and data to mobile and handheld devices via their digital broadcast signal. The resulting standard proposal, referred to as ATSC M/H, is intended to be backwards compatible with the existing A53 standard, allowing operation of existing ATSC services in the same radio frequency (RF) channel without an adverse impact on existing receiving equipment.

The existing or legacy A53 standard, at present, defines generating and transmitting a signal for the intended use by receivers that are generally fixed (e.g., in a home) and that are coupled to large antennas for capturing the transmitted signal. However, the legacy A53 standard transmitted signals are not sufficiently rugged or robust to allow a mobile receiver or a receiver with a small antenna that is used in portable televisions, vehicular televisions, cellular telephones, personal data assistants, etc. to effectively extract the source data encoded in such signals. In particular, the redundancy provided by the combination of Reed Solomon encoder and 2/3-rate trellis used in the transmission of existing A53 standard broadcast signals is not sufficient and lower rate encoders (i.e., those that have greater redundancy) are necessary for mobile applications. Therefore it is desirable to introduce more robust encoding processes adapted to better perform with advanced receivers in mobile, handheld and pedestrian devices. It is further desirable to allow for variable operation within the mobile broadcast including variable code rates and variable data segment sizes for transmission. Additionally, any new system operating within the legacy A53 standard is expected to be backward compatible. As a result, it is also desirable for mobile systems using long data segment transmission to include a mechanism to prevent degradation of performance of the receivers intended for receiving legacy A53 transmission.

SUMMARY OF THE INVENTION

In accordance with an aspect of the present embodiments, a method is disclosed that includes the steps of generating data blocks, encoding a first set of data blocks using a first encoding rate, encoding a second set of data blocks using a second encoding rate, and generating a control packet, the control packet identifying the first set of data blocks and the first encoding rate, and identifying the second set of data blocks and the second encoding rate.

In accordance with another aspect of the present embodiments, an apparatus is disclosed that includes means for generating data blocks, means for encoding at least a portion of the data blocks using one of a first encoding rate and a second encoding rate, and means for generating a control packet, the control packet identifying the at least a portion of the data blocks and identifying the encoding rate as one of the first encoding and the second encoding rate.

In accordance with another aspect of the present embodiments, a method is disclosed that includes the steps of encoding a first set of data blocks, determining a data length for the first set of encoded data blocks, and inserting at least one data block from a second set of data blocks within the first set of encoded data blocks if the data length is greater than a data length threshold.

In accordance with another aspect of the present embodiments, an apparatus is disclosed that includes a first decoder, the first decoder receiving data and decoding a first subset of the data, including a control packet, at a first decoding rate and a controller, coupled to the first decoder, the controller controlling the operation of the first decoder based on a decoded control packet.

In accordance with another aspect of the present embodiments, a method is disclosed that includes the steps of transmitting a first signal at a first data rate, determining if the first data rate is below a data rate threshold, and transmitting a second signal in place of the first signal if the first data rate is less than the data rate threshold.

BRIEF DESCRIPTION OF THE DRAWINGS

In the drawings:

FIG. 7 is a table illustrating row oriented data of the present disclosure;

FIG. 8 is a table illustrating column oriented data of the present disclosure;

The characteristics and advantages of the present invention may become more apparent from the following description, given by way of example.

DETAILED DESCRIPTION

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort would nevertheless be a routine undertaking of design, fabrication, and manufacture for those of ordinary skill having the benefit of this disclosure.

The following describes a system relating to television broadcast signals, and more particularly to broadcast signals as defined for use in the United States. The embodiments described may be used in mobile, handheld, or pedestrian devices. Examples of the devices used include, but are not limited to, cellular phones, intelligent phones, personal digital assistants, laptop computers, and portable televisions. Other systems utilized to transmit and receive other types of signals may include similar structures and processes. Those of ordinary skill in the art will appreciate that the embodiments of the circuits and processes described herein are merely one set of potential embodiments. It is important to note that signals compliant with broadcast and wireless standards, such as the A53 standard, in general, may be transmitted in a manner other than over the air, including transmission over satellite link, co-axial cable, or telephone lines. As such, in alternate embodiments, the components of the system may be rearranged or omitted, or additional components may be added. For example, with minor modifications, the system described may be configured for use in satellite video and audio services or phone data services including services used elsewhere in the world.

Figure 1:
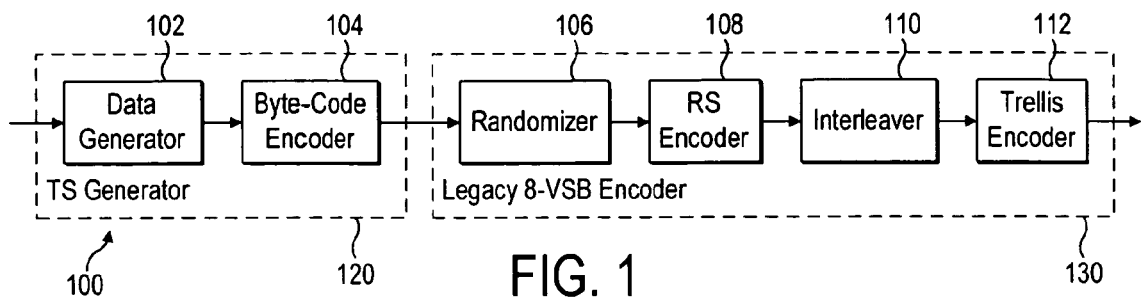
FIG. 1 is a block diagram of an embodiment of an encoder of the present disclosure.

Turning now to FIG. 1, a block diagram of an embodiment of an encoder 100 is shown. Encoder 100 includes processing circuitry adapted to encode data resulting in a rugged or robust data stream. Encoding the data in a rugged data stream allows recovery of the data in difficult transmission environments. For instance, the rugged data stream produced by encoder 100 permits improved reception of broadcast television signals by handheld, mobile, or pedestrian receiving devices. A data generator 102 receives and process incoming data content, such as audio and video content. Data generator 102 connects to a byte code encoder 104. The byte code encoder 104 connects to randomizer 106. The randomizer 106 connects to Reed Solomon encoder 108. The Reed Solomon encoder 108 connects to interleaver 110. The interleaver 110 connects to trellis encoder 112. The trellis encoder 112 provides a rugged or robust data stream for use in the remaining transmission system.

The byte-code encoder 104 receives a stream of data arranged into data packets from the data generator 102. The stream of data packets may be organized into groups of 187 bytes. Each data packet typically includes a three byte header of which thirteen bits in the three bytes are a packet identifier (PID) that identifies the type of data that are sent in the packet. For example, a packet with a PID that has a value of 0x11 (hex 11) may identify the content of the packet as part of a first video stream and a packet including a PID that has a value of 0x14 may identify the contents of the packet as part of a first audio stream. It is important to note that other arrangements for the stream of data packets are possible. Additionally, each data packet may include one or more codewords or further may include portions of codewords. The byte-code encoder 104 encodes each data packet based on an arrangement of codewords to produce new codewords. In one embodiment, the byte code encoder 104 is a rate 1/2 encoder. A rate 1/2 byte-code encoder 104 provides two output codewords for each codeword provided at the input. Other encoding rates may be used for the byte code encoder 104. Detailed operation of the byte-code encoder 104 will be described in further detail below.

The stream of data packets including the new codewords from the byte code encoder 104 is provided to the randomizer 106. The randomizer 106 randomizes the stream of data packets from the transmission source 302. Typically, the randomizer uses a known randomizing function, such as multiplying or exclusive or-ing (XORing) the incoming data with a known sequence of values, in order to improve the transmission quality and reception of the data stream. The randomizer 106 provides the stream of data packets to Reed Solomon encoder 108. Reed-Solomon encoder 108 encodes each 187-byte randomized packet to produce a 207-byte packet containing one or more codewords.

The Reed-Solomon error correction algorithm takes advantage of the properties of a Galois Field. Specifically, a Galois Field GF(p$^n$) is a mathematical set comprising a finite number of elements p$^n$ where the values of p and n are integers. A particular Galois Field is defined using a generator polynomial g(x). Each element of the Galois Field may be represented by a unique bit pattern having n bits. Furthermore, a unique polynomial of degree p$^n$ may be associated with each element where each coefficient of the polynomial is between 0 and p−1. Further, mathematical operations in the Galois Field have important properties. Addition of two elements of the Galois Field GF(p$^n$) is defined as an element associated with a polynomial that has coefficients that are the modulo-p sum of the coefficients of the polynomials associated with the two elements being added. Similarly, multiplication of two elements is defined as the multiplication of the polynomials associated with the two elements modulo the generator polynomial g(x) associated with the Galois Field. Addition and multiplication operators are defined over the Galois Field such that the sum and product of any two elements of the Galois Field are elements of the Galois Field. A property of the Reed-Solomon codeword is that multiplying each byte of the codeword by an element of the Galois Field results in another valid Reed-Solomon codeword. Furthermore, byte-by-byte addition of two Reed-Solomon codewords produces another Reed-Solomon codeword. The legacy A53 standard defines a 256 element Galois Field GF(2$^8$) and the associated generator polynomial g(x) for use in the Reed-Solomon algorithm. The properties of the Galois Field also create the ability to generate syndromes for the codewords in order to determine errors.

The Reed-Solomon encoder 108 typically produces the 20 new bytes and appends the 20 new bytes to the end of the 187-byte codeword. The interleaver 110 interleaves each of the 207-byte codewords output from the Reed-Solomon encoder 108 and provides the result to trellis encoder 112 in preparation for modulation and transmission. The randomizer 106, Reed-Solomon encoder 108, interleaver 110, and trellis encoder 112 may be identical to those used in existing legacy transmitters that comply with existing television broadcast standards, such as the legacy A53 standard.

As shown, data generator 102 and a byte-code encoder 104 may be considered as part of a transmission source 120. The packets (original content and byte-code encoded) generated by the byte-code encoder 104 are included in a rugged data stream that may be provided to the randomizer 106 included as part of a legacy 8-VSB signal encoder 130. The legacy 8-VSB encoder 130 encodes the rugged or robust codewords or packets compliant with The A53 Standard. Moreover, the additional functionality of byte-code encoder 104 to produce a rugged or robust data stream may be added with minimal change to the existing hardware structure of existing transmission equipment such as legacy 8-VSB encoder 130.

As described above, the two codewords or packets generated by a rate 1/2 byte-code encoder 102 include a duplicate of the originally input codeword and a new codeword that provides redundancy to the original codeword. The two codewords may also be described as systematic data and non-systematic data. It is important to note that the codewords representing systematic and non-systematic data may be arranged to form larger data structures. In a preferred embodiment, the codewords may be organized to form a rugged data stream of data packets. The rugged data stream includes systematic packets, which are duplicates of the data packets in a stream portion A, and non-systematic packets generated by the processing of a byte-code encoder in a stream portion A'. Non-systematic packets also include packets that may be derived from other systematic and non-systematic packets of the rugged data stream. Further, the packets in the rugged data stream may be further composed of systematic bytes and non-systematic bytes. In such embodiments, a systematic byte is a duplicate of byte of content data and a non-systematic byte is one that is derived from other systematic and non-systematic bytes.

The redundant or non-systematic codeword or packet output by a byte-code encoder is the result of multiplying each byte of the incoming codeword or packet by an element b of the Galois Field GF(256). In one embodiment, if the data generator 102, as a transmission source generate a message M, which is comprised of bytes M(1), M(2), . . . , M(187), where M(1) is the first byte of the message, M(2) is the second byte of the message, etc., then subsequently, the byte-code encoder 104 produces the codewords A and A' from the codeword M, as follows:

$$A(i)=M(i)\ i=1,2,\ldots,187 \qquad (1)$$

$$A'(i)=b*M(i)\ i=1,2,\ldots,187 \qquad (2)$$

The value b is a predetermined (non-zero) element of the same Galois Field GF(256) that may used by the Reed-Solomon encoder 108. In an illustrative embodiment, the value of the b element is 2. It should be apparent that using the same Galois Field for both the byte-code encoder and the Reed-Solomon encoder allows operations between the two encoders based on the properties of the Galois Field. Byte-code encoder 104 encodes all of the bytes of the data packet, including the bytes that form the header containing the PID, to generate one or more non-systematic packets of the rugged data stream. Thus, the PID of each non-systematic packet is byte-code encoded and may no longer represent a PID value that is recognizable to a receiving device.

It should be apparent that any packets encoded by the embodiment of the transmitter depicted by encoder 100 may be decoded by an embodiment of a decoder used in a legacy receiver that complies with the A53 standard. The decoder in a legacy receiver provides packets of the rugged data stream to a data decoder. The rugged data stream includes non-systematic packets that are encoded using a byte-code encoder that will be decoded correctly by a decoder in a legacy receiver, but will result in data content that is unrecognizable by the legacy receiver. However, because such packets have a PID that is not associated in the Program Map Table (PMT) with an existing or legacy data format, the content decoder in a legacy receiver ignores these non-systematic packets of the rugged data stream.

Byte-code encoder 104 uses equation (2) above to generate a non-systematic packet for each systematic packet and provides both packets to the legacy 8-VSB encoder 130 for transmission to produce an encoded stream with an effective data rate of 1/2 (that is, 1 byte in, 2 bytes out). As mentioned earlier, byte code encoder 104 may be capable using other encoding rates to produce other effective data rates. In some embodiments, the byte-code encoder may produce one byte-encoded packet for every two source packets, $M_A$ and $M_B$, produced by the data generator 104 to generate a rate 2/3 rugged data stream comprising the two systematic packets and one non-systematic packet calculated as follows:

$$M_{AB}(i)=M_A(i)*b_1+M_B(i)*b_2 \; i=1,2,\ldots,187 \tag{3}$$

where $M_A$ and $M_B$ are consecutive systematic packets produced by the data generator 102 and $b_1$ and $b_2$ are predetermined elements of a Galois Field, such as the Galois Field used by the Reed-Solomon encoder 108. In an illustrative embodiment, the value of the $b_1$ and $b_2$ elements is 2. In some embodiments, the values of $b_1$ and $b_2$ may not be identical. The byte-code encoder 104 provides the packets $M_A$, $M_B$, and $M_{AB}$ to the legacy 8-VSB encoder 130 for further encoding and transmission.

Byte-code encoder 104 may use different coding rates to produce rugged data streams (i.e., ones having lower data rates) by including additional input data packets for generating the redundant packets. Another embodiment of the byte-code encoder 104 produces a rate 4/9 data stream by employing four systematic packets $M_A$, $M_B$, $M_C$, and $M_D$ from the data generator 102 and 5 non-systematic packets calculated as follows:

$$M_{AB}(i)=M_A(i)*b_1+M_B(i)*b_2 \; i=1,2,\ldots,187 \tag{4}$$

$$M_{CD}(i)=M_C(i)*b_3+M_D(i)*b_4 \; i=1,2,\ldots,187 \tag{5}$$

$$M_{AC}(i)=M_A(i)*b_5+M_C(i)*b_6 \; i=1,2,\ldots,187 \tag{6}$$

$$M_{BD}(i)=M_B(i)*b_7+M_D(i)*b_8 \; i=1,2,\ldots,187 \tag{7}$$

$$M_{ABCD}(i)=M_{AB}(i)*b_9+M_{CD}(i)*b_{10} \; i=1,2,\ldots,187 \tag{8}$$

The values $b_1, b_2, \ldots, b_{10}$ are predetermined elements selected from the Galois Field. In an illustrative embodiment, the values for $b_1, b_2, \ldots, b_{10}$ are 2. In addition, as shown in equation (8), the packet $M_{ABCD}$ is a redundant packet generated from other redundant packets only, specifically packets $M_{AB}$ and $M_{CD}$. It should be apparent that the redundant packet $M_{ABCD}$ may be alternately generated using the elements of the redundant packets $M_{AC}$ and $M_{BC}$. In some embodiments of the transmission source generator 120, elimination of one or more non-systematic packets may be performed in an operation known as puncturing. For instance, a punctured rate 4/8 may be produced by not generating one of the packets that would have employed only redundant packets (i.e., $M_{ABCD}$ in this case) because this packet contains the smallest amount of intrinsic data. Any packet or codeword may be removed. However, removal of a packet or codeword containing the smallest amount of intrinsic data may be optimal. Code puncturing may be used to change the number of transmitted packets in order to meet certain limitations on number of packets or codewords transmitted.

Further, byte-code encoder 104 may also produce a rugged data stream that has a data rate of 8/27 by employing 8 data packets $M_A$, $M_B$, \ldots, $M_H$ to produce 19 non-systematic packets, as follows:

$$M_{AB}(i)=M_A(i)*b_1+M_B(i)*b_2 \; i=1,2,\ldots,187 \tag{9}$$

$$M_{CD}(i)=M_C(i)*b_3+M_D(i)*b_4 \; i=1,2,\ldots,187 \tag{10}$$

$$M_{AC}(i)=M_A(i)*b_5+M_C(i)*b_6 \; i=1,2,\ldots,187 \tag{11}$$

$$M_{BD}(i)=M_B(i)*b_7+M_D(i)*b_8 \; i=1,2,\ldots,187 \tag{12}$$

$$M_{ABCD}(i)=M_{AB}(i)*b_9+M_{CD}(i)*b_{10} \; i=1,2,\ldots,187 \tag{13}$$

$$M_{EF}(i)=M_E(i)*b_{11}+M_F(i)*b_{12} \; i=1,2,\ldots,187 \tag{14}$$

$$M_{GH}(i)=M_G(i)*b_{13}+M_H(i)*b_{14} \; i=1,2,\ldots,187 \tag{15}$$

$$M_{EG}(i)=M_E(i)*b_{15}+M_G(i)*b_{16} \; i=1,2,\ldots,187 \tag{16}$$

$$M_{FH}(i)=M_F(i)*b_{17}+M_H(i)*b_{18} \; i=1,2,\ldots,187 \tag{17}$$

$$M_{EFGH}(i)=M_{EF}(i)*b_{19}+M_{GH}(i)*b_{20} \; i=1,2,\ldots,187 \tag{18}$$

$$M_{AE}(i)=M_A(i)*b_{21}+M_E(i)*b_{22} \; i=1,2,\ldots,187 \tag{19}$$

$$M_{BF}(i)=M_B(i)*b_{23}+M_F(i)*b_{24} \; i=1,2,\ldots,187 \tag{20}$$

$$M_{CG}(i)=M_C(i)*b_{25}+M_G(i)*b_{26} \; i=1,2,\ldots,187 \tag{21}$$

$$M_{DH}(i)=M_D(i)*b_{27}+M_H(i)*b_{28} \; i=1,2,\ldots,187 \tag{22}$$

$$M_{ACEG}(i)=M_{AC}(i)*b_{29} M_{EG}(i)*b_{30} \; i=1,2,\ldots,187 \tag{23}$$

$$M_{BDFH}(i)=M_{BD}(i)*b_{31}+M_{FH}(i)*b_{32} \; i=1,2,\ldots,187 \tag{24}$$

$$M_{ABEF}(i)=M_{AB}(i)*b_{33}+M_{EF}(i)*b_{34} \; i=1,2,\ldots,187 \tag{25}$$

$$M_{CDGH}(i)=M_{CD}(i)*b_{35}+M_{GH}(i)*b_{36} \; i=1,2,\ldots,187 \tag{26}$$

$$M_{ABCDEFGH}(i)=M_{ABCD}(i)*b_{37}+M_{EFGH}(i)*b_{38} \quad i=1,2,\ldots,187 \tag{27}$$

Additionally, a punctured code with data rate of 8/26 may be generated by the byte-code encoder 104 by not generating the smallest intrinsic data value packet $M_{ABCDEFGH}$, or another packet generated from only redundant packets.

As described above, a byte-code encoder may be configured to produce certain encoding code rates based on the number of codewords or packets used and the number of codewords or packets formed through a single encoding process. In addition, more complicated code rates may be constructed using particular arrangements of the previously described code rate encoders as building blocks or constituent code rate encoders. Further, additional processing blocks may be included to form a concatenated byte-code encoder. For example, a concatenated byte-code encoder may use additional interleaving blocks between constituent byte-code encoders in addition to redundancy to improve the ruggedness of the data stream produced. Various embodiments of concatenated byte-code encoders will be described below.

Figure 2:
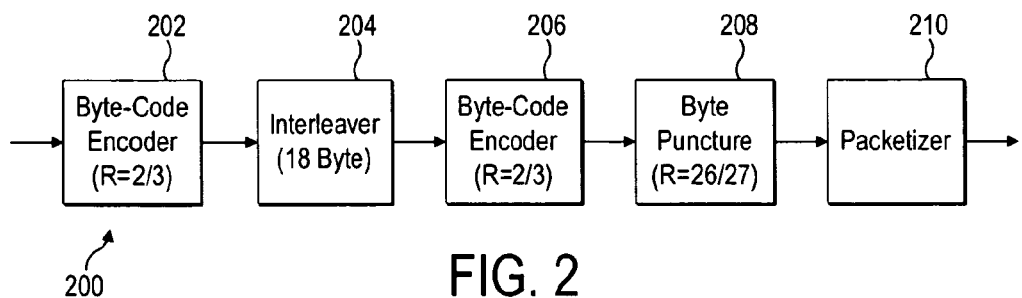
FIG. 2 is a block diagram of an embodiment of a concatenated byte-code encoder of the present disclosure.

Turning now to FIG. 2, an embodiment of a concatenated byte-code encoder 200 is shown. The concatenated byte-code encoder 200 may be used in place of the constituent byte code encoder 104 described in FIG. 1 and allows encoding of codewords in the data stream using a 12/26 code rate. The concatenated byte-code encoder receives packets or codewords and provides them to a first 2/3 rate byte-encoder 202. The output of the first 2/3 rate byte-code encoder 202 is provided to an interleaver 204. The output of the interleaver 204 is provided to a second 2/3 rate byte-code encoder 206. The output of the second 2/3 rate byte-code encoder 206 is provided to a byte puncture block 208. The output of the puncture block 208 is provided to a data packetizer 210. The output of the data packetizer 210 may be provided for further processing (e.g. legacy transmission encoding as previously described in FIG. 1.)

The first 2/3-rate byte-code encoder 202 receives 12 bytes of the content data packets and generates a first byte-code encoded stream from the 12 bytes. For every two content data bytes $M_A$ and $M_B$ of the 12 bytes, the first byte-code encoded stream included duplicates of the bytes $M_A$ and $M_B$ and a redundant byte $M_{AB}$ that is calculated as described earlier. In some embodiments, the content data bytes $M_A$ and $M_B$ are bytes of one content data packet generated by a data generator (e.g. data generator 102 in FIG. 1.) In other embodiments, the first 2/3-rate byte-code encoder 202 selects the content data bytes $M_A$ and $M_B$ from two different content data packets A and B, respectively. For every 12 bytes of content data, 18 bytes are output as part of the first byte-code encoded output stream.

The byte-code encoded stream from the first byte-code encoder 202 is interleaved by an interleaver 204 to produce an interleaved stream containing 18 interleaved bytes. The interleaver 204, as well as other interleavers described below, may use any of the interleaving methods known in the art (e.g., pseudo-random, row-column, code-optimized, etc.). In addition, interleavers may also include a memory with a storage capacity to store the entire interleaver data length. In a preferred emobodiment, interleaver 204 arranges the output bytes as presented in table 300 shown in FIG. 3. Table 300 includes a row 310 indicating the position of the bytes at the input. Row 320 indicates the order of the bytes as they are read out at the output. The interleaved stream is provided to a second 2/3-rate byte-code encoder 206, The second 2/3 rate byte-code encoder 206 encodes the groups of 18 interleaved bytes in the interleaved stream to generate a second byte-code encoded stream that includes groups of 27 bytes. As described above, for every two bytes $M_A$ and $M_B$ produced by the interleaver, the second 2/3-rate byte-coded stream has duplicates of the two bytes $M_A$ and $M_B$ and a byte $M_B$. It should be apparent that byte $M_A$ may be a duplicate of one of the bytes of content data generated by a data generator (e.g. data generator 102 in FIG. 1.) or may be a byte developed as a redundant or non-systematic byte by the first byte-code encoder 202. Similarly, the byte $M_B$ may be a duplicate of a byte of the content data or a byte developed as a redundant or non-systematic by first byte-code encoder 202.

Interleavers used in encoders are often very long in interleaver length or depth. For instance, traditional interleavers emphasize a long interleaving length or depth when employed with convolutional encoding systems. Improvements in coding performance are typically gained as a result of longer interleavers employed with convolutional encoders. In many cases, the longer the interleaver length results in a higher the coding performance gain. Because of the long interleaver length or depth, the interleaver pattern is typically randomized and optimization of the pattern for maximum coding gain is not practical. In contrast, the interleavers, such as interleaver 204, used in the concatenated byte-code encoders are short in length and optimized for the coding rate. Contrary to traditional approaches, the interleavers used with the byte-code encoding process emphasize low latency using a short length or depth. The byte-coder encoder involves a linear block encoding process and does not operate in a manner like a convolutional encoder. An interleaver employing an interleaver length of more than three times the length of the codeword results in a diminished coding performance improvement. Optimization of the interleaver pattern based on a short intereleaver length, as used in the byte-code encoders described, is possible and desired. A byte puncture block 208 removes one byte from the group of 27 bytes in the second byte-code encoded stream to produce a punctured stream containing groups 26 bytes. Byte puncturing is used to improve data efficiency by reducing the number of bytes provided and transmitted for a given coding structure. However, the improved data efficiency is traded off against the resulting degradation in performance in the decoding circuitry in a receiver due to the absence of one or more encoded bytes from the data stream. Byte puncturing may also be used to produce a grouping or block of bytes or packets of encoded data that is convenient for the transmission format. Coding structures based on certain groupings of bytes or packets are often referred to as block codes.

Byte puncture block 208 may also remove more than 1 byte from the second encoded stream. For instance, it may be possible to identify 3 bytes that may be removed to produce a 12/24-rate data stream. Puncturing more than one byte will further degrade the effectiveness of the encoding while gaining an improvement in coding rate. Removal of one or more bytes in the byte puncture block 208 may be achieved with minimal coding performance loss based on optimal interleaving in interleaver 204 as described above. In this way the puncturing and short length interleaving, as described above, interact to allow an optimal code rate based on producing a given output block size of output packets.

Packetizer 210 combines and groups bytes from the punctured stream into discrete packets of 187 bytes. The rugged data stream produced by the components of the byte-code encoder 200 produces a 12/26-rate data stream. The byte code encoder 200 may also produce a 12/27-rate data stream if the byte puncture block 208 is not used.

Concatenated byte-code encoders similar to concatenated byte-code encoder 600 may be employed to produce rugged data streams other than the 12/27-rate and 12/26-rate rugged data streams described above. For instance, data streams with code rates such as 17/26 and 12/52 rate may be produced through combinations of constituent byte-code encoders, interleavers, and puncture blocks. Similarly, other types or arrangements of interleavers or puncture blocks may be substituted for those used in the described embodiments.

Figure 4:
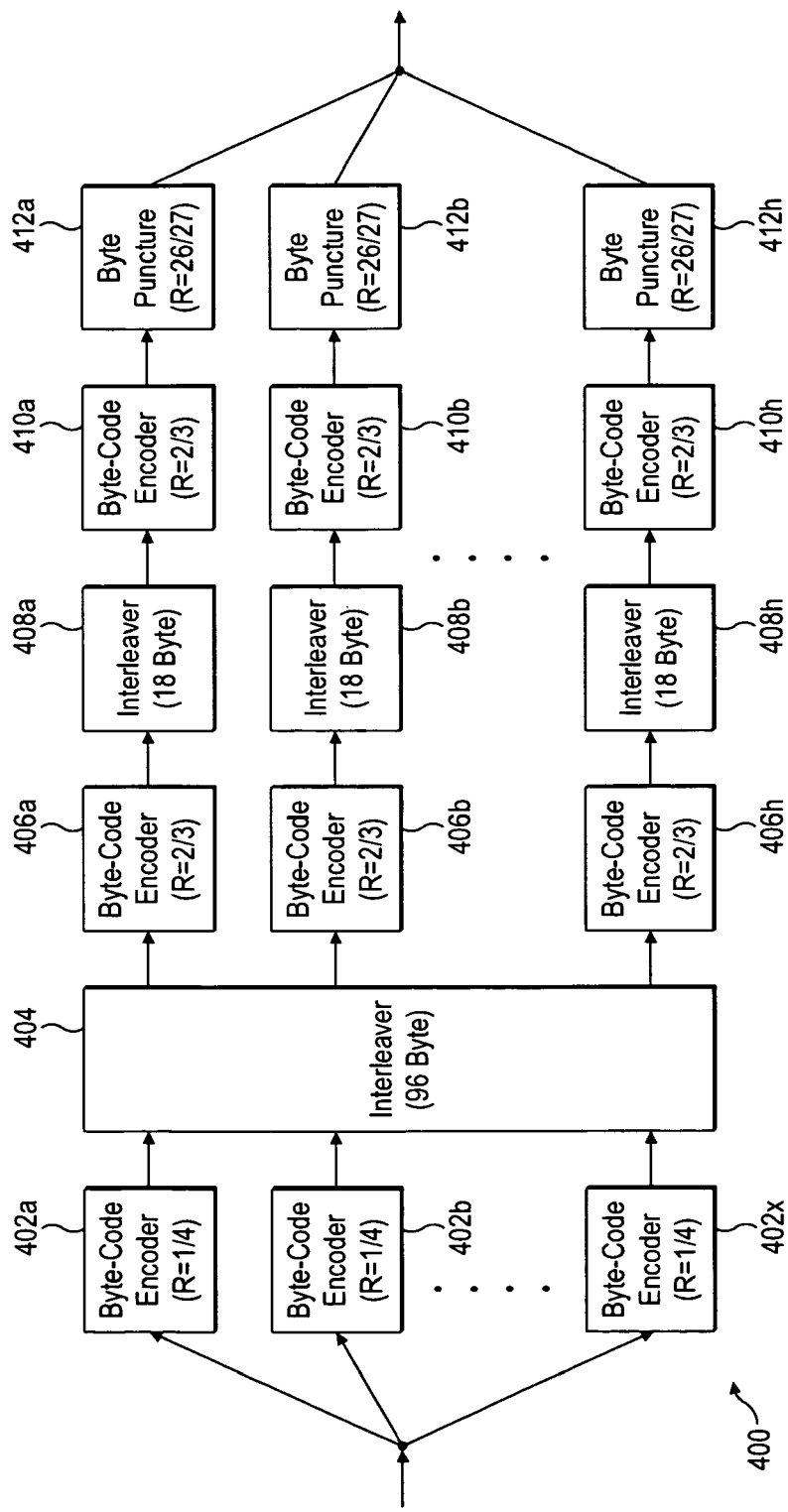
FIG. 4 is block diagram of another embodiment of a concatenated byte-code encoder of the present disclosure.

Turning now to FIG. 4, another embodiment of a concatenated byte-code encoder 400 is shown. The byte-code encoder shown represents a 24/208 code rate encoding system. The byte-code encoder 400 shown may also be referred to as a block code encoder. The incoming data stream of packets may be arranged into blocks of data in order to facilitate the high coding or redundancy levels introduced in the encoder. Typically, a rugged data stream using a 24/208 code rate represents a very low data rate encoding system. Such a low data rate rugged data stream may be useful in extremely difficult signal environments and offers a high level of data redundancy by providing seven redundant bytes for every one byte of original data. The encoder 400 utilizes parallel encoding structures in order to provide an efficient structure and allow either parallel operation or high speed multiplexed sequential operation by reusing identical operational blocks multiple times. The description of encoder 400 will be described in a full parallel arrangement, however, known multiplexing and re-use techniques may be used to reduce the overall hardware size.

The incoming data stream is split or demulitplexed and provided to 24 rate 1/4 byte-code encoders 402a-402x. The output of each rate 1/4 byte-code encoder 402a-402x is connected to symbol interleaver 404. The symbol interleaver 404 produces 8 outputs with each output connected to a rate 2/3 byte-code encoder 406a-406h. Each rate 2/3 byte-code encoder 406a-406h connects to a symbol interleaver 408a-408h. Each symbol interleaver 408a-408h connects to a second rate 2/3 byte-code encoder 410a-410h. Each of the second rate 2/3 byte-code encoders 410a-410h connects to a puncture block 412a-412h. The outputs of each puncture block 412a-412h are re-combined to form the block coded data stream. Each parallel arrangement of first byte-code encoder 406a-406h, symbol interleaver 408a-408h, second byte-code encoder 410a-410h, and puncture block 412a-412h form a rate 12/26 encoder structure equivalent to the encoder described in FIG. 2 and will not be further described here.

The incoming data stream is parsed into groups of 24 bytes of data or codewords arranged in byte order in parallel. Each one of the 24 bytes is separated and processed in a rate 1/4 byte-code encoder 410a-410x, producing 24 outputs each containing 4 bytes. As described above, the 4 bytes are composed of 1 systematic byte and 3 non-systematic or redundant bytes. As result, the byte-code encoders 410a-410x produce codewords A, A', A", and A'" from a codeword M, as follows:

$$A(i)=M(i)\ i=1,2,\ldots,187 \quad (28)$$

$$A'(i)=b_1*M(i)\ i=1,2,\ldots,187 \quad (29)$$

$$A''(i)=b_2*M(i)\ i=1,2,\ldots,187 \quad (30)$$

$$A'''(i)=b_3*M(i)\ i=1,2,\ldots,187 \quad (31)$$

As described above, the values $b_1$, $b_2$, and $b_3$ are predetermined (non-zero) elements of the same Galois Field GF(256) that may used by a subsequent Reed-Solomon encoder. In an illustrative embodiment, the value of $b_1$, $b_2$, and $b_3$ is 2. In some embodiments, the values of $b_1$, $b_2$, and $b_3$ may not be identical.

Figure 5:
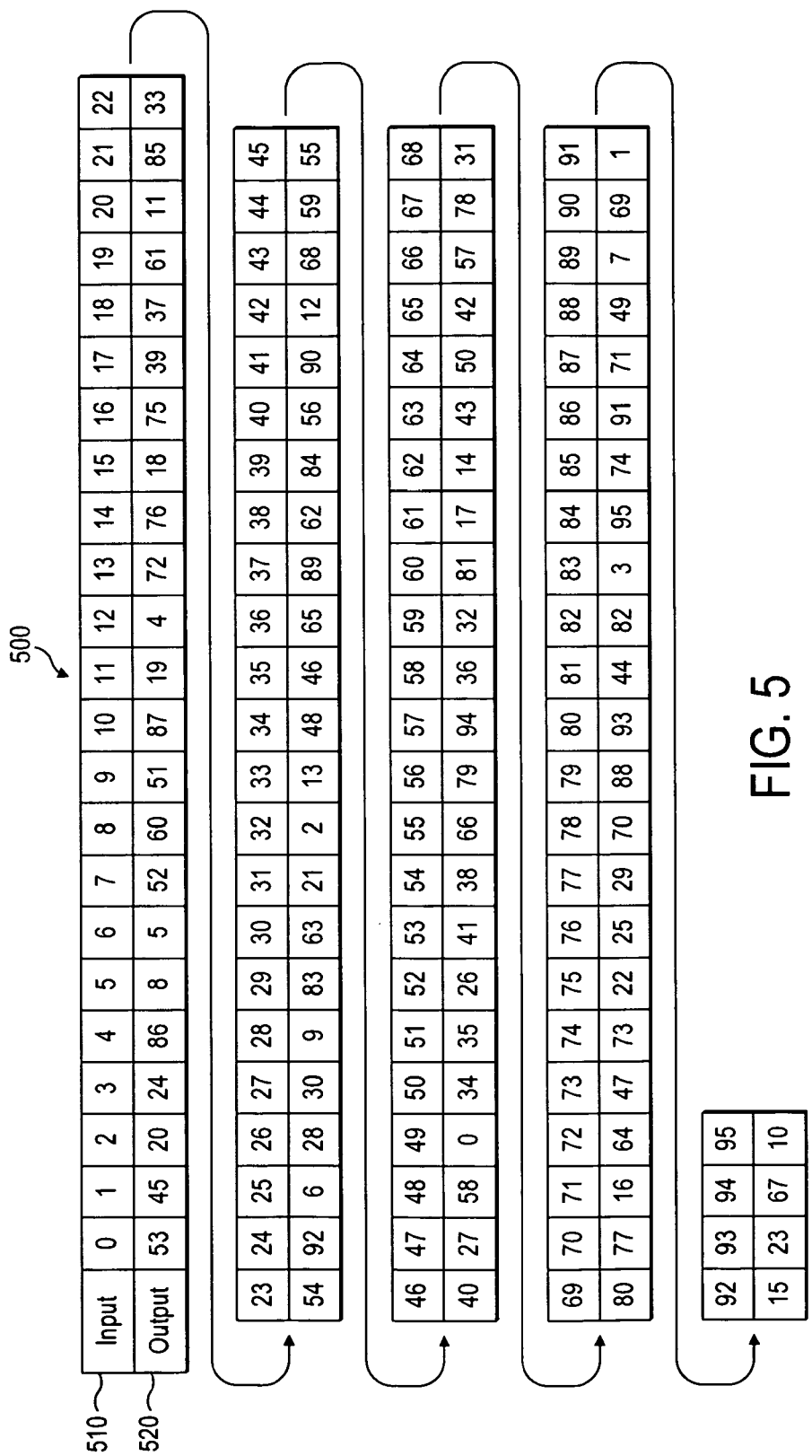
FIG. 5 is a table illustrating another map of data interleaving of the present disclosure.

The 24 sets of 4 bytes are collected in byte order and input into the symbol interleaver 404. The symbol interleaver 404, as described earlier in FIG. 2, may use any of the interleaving methods known in the art (e.g., pseudo-random, row-column, code-optimized, etc.). In addition, interleavers may also include a memory with a storage capacity to store the entire interleaver data length. In a preferred emobodiment, interleaver 404 arranges the output bytes as presented in table 500 shown in FIG. 5. Table 500 includes a row 510 indicating the position of the bytes at the input. Row 520 indicates the order of the bytes as they are read out at the output. Interleaver 404 may include the byte collection or multiplexing function at its input. Interleaver 404 may also include the byte set separating or multiplexing function at its output.

The output bytes from the interleaver 404 are re-grouped into 8 sets of 12 bytes. Each set of 12 bytes is input to the rate 2/3 byte-code encoders 406a-406h and on through the remaining processing chain as described for encoding a rugged data stream using rate 12/26 encoding as described in FIG. 2 above. The outputs of each of the puncture blocks 412a-412h, represents a coded stream at rate 12/26 are recombined or demultiplexed back into a signal byte-code encoded stream containing 208 bytes.

It is important to note that the data byte separating, arranging, and recombining may be performed following several possible configurations. The input order and equivalent output order may not be the same. The number of sets of inputs portions of bytes and number of sets of output portions of bytes may also be different. For instance, in one configuration, the interleaver 404 may order the incoming bytes by maintaining the arrangement of 1 systematic byte and 3 non-systematic bytes from each of the rate 1/4 byte-code encoders. The output interleaving process may then result in an output set of 12 bytes containing 3 systematic bytes and 9 non-systematic bytes in each 12 byte set. In a second configuration, the interleaving process allows the collection of the original 24 non-systematic bytes into the first two 12 byte sets. The remaining non-systematic bytes compose the remaining six 12 byte sets. The latter configuration may allow more efficient reception and decoding, by allowing the receiver to discard some or all of the non-systematic bytes if the systematic bytes have been properly decoded and recovered.

Figure 6:
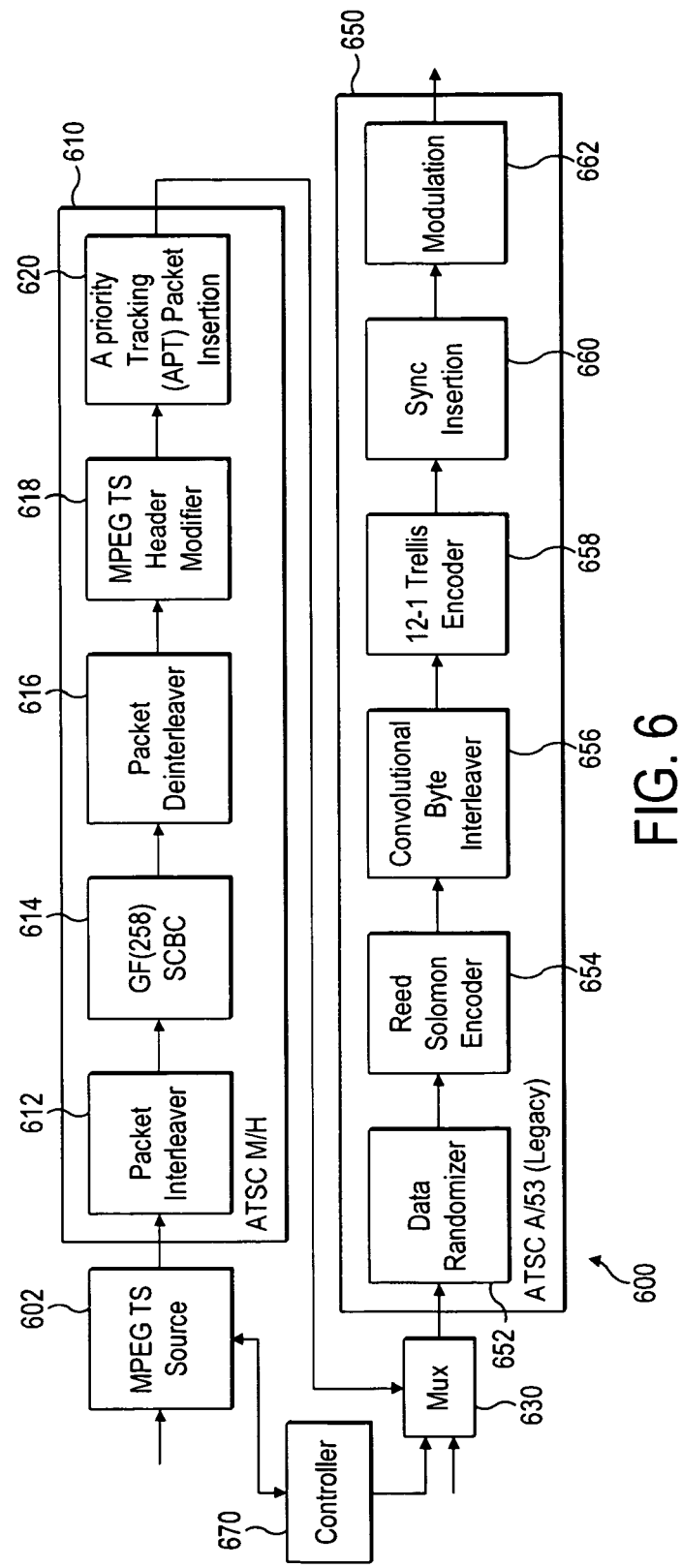
FIG. 6 is a block diagram of another embodiment of an encoder used in a transmitting device of the present disclosure.

Turning now to FIG. 6, a block diagram of a further embodiment of an encoder 600 is shown. Encoder 600 is an alternative to encoder 100 shown in FIG. 1 and is particularly suited for encoding and transmitted a rugged stream in conjunction with the A53 transmission standard. Encoder 600 includes an MPEG transport stream source 602. The MPEG transport stream source 602 is connected to an ATSC M/H block 610 that contains several additional blocks. The blocks contained within the ATSC M/H block 610 process an incoming data stream and produce a rugged data stream adapted for reception and use by mobile, pedestrian, and handheld devices. These blocks will be further described below. The ATSC M/H block 610 is connected to a mux 630. The mux 630 also receives transport data content for use with legacy ATSC A53 only encoding. The mux 630 connects to an ATSC A53 legacy block 550 that also contains several additional blocks within it. The blocks with ATSC A53 legacy block 550 may represent blocks used for encoding and transmitting the existing a broadcast signal in an A53 signal format. These blocks will also be further described below. A controller 670 is connected to mux 630 and MPEG transport stream source 602. Controller 670 may also connect to other blocks in encoder 600.

Within ATSC M/H block 610, a packet interleaver 612 receives a stream of data arranged in packets. Each packet contains 187 bytes and includes a 3 byte header used for packet identification. The output of the packet interleaver 612 is provided to a GF(256) Serial Concatenated Block Coder (SCBC) 614. The output of the GF(256) SCBC 614 is connected to a packet deinterleaver 616. The output of the packet deinterleaver 616 is connected to a transport stream header modifier 618. The output of the transport stream header modifier 618 is connected to an a-priori transport packet inserter 620. The output of the a-priori transport packet inserter 520 is connected to the mux 630.

Figure 7:
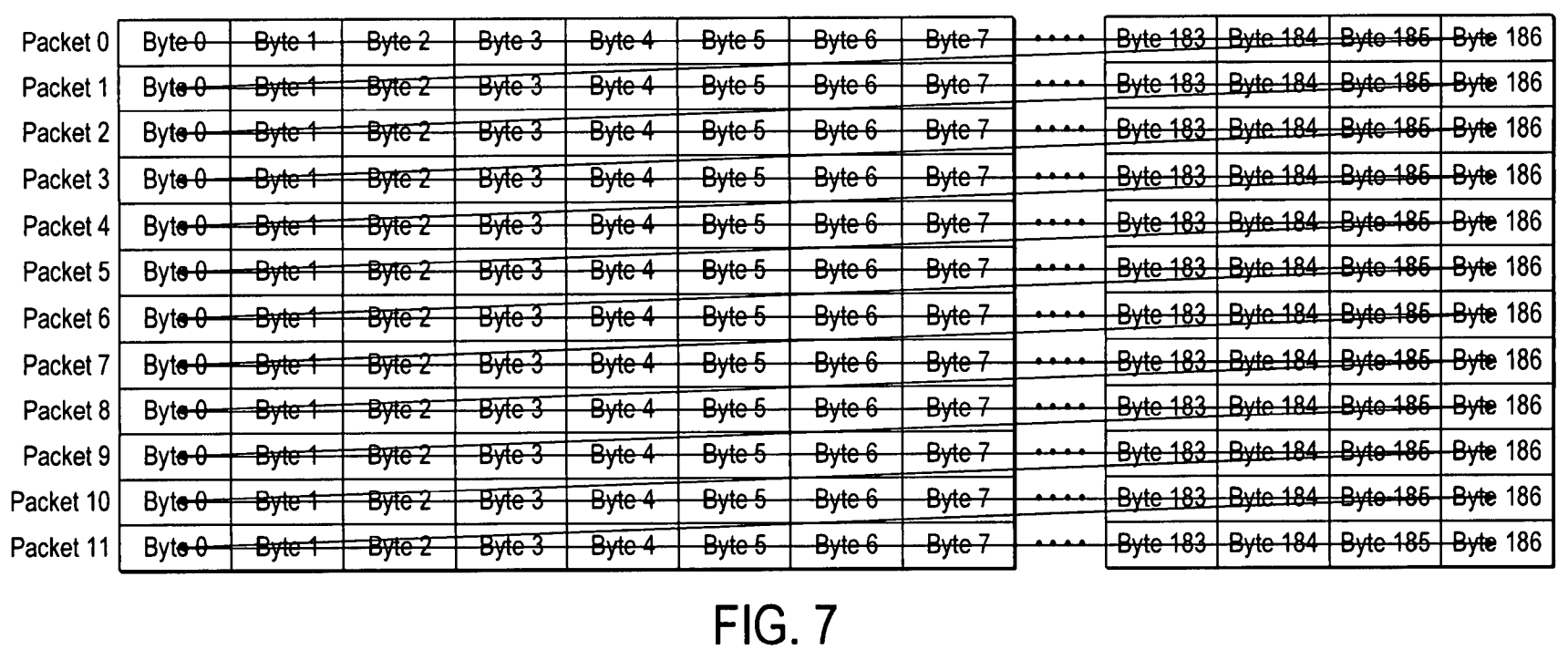
Figure 8:
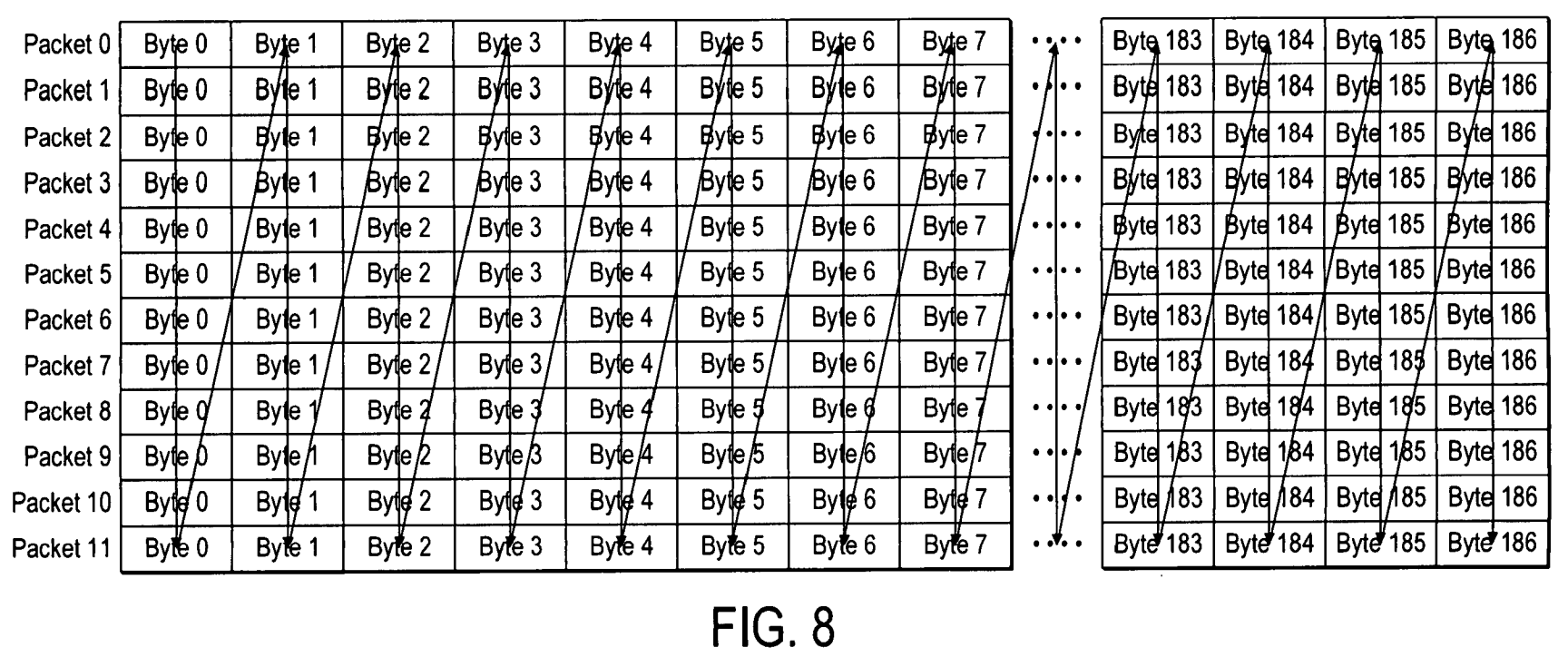

The packet interleaver 612 rearranges the data received as packets arranged in rows into codewords based on columns of bytes from the rows of packets. Packet interleaver 612 takes the bytes from a fixed number of consecutive packets in a row-by-row order as illustrated in FIG. 7, and outputs the bytes column by column as illustrated in FIG. 8. In particular, FIGS. 7 and 8 illustrate reading in 12 rows of 187-byte packets and outputting 187 columns of 12-byte codewords. As a result of the packet interleaving, all of the first bytes, labeled byte 0, are grouped together; all of the second bytes, labeled byte 1, are grouped together; and so forth. The number of packets read into the interleaver constitute a source frame and equals the number of source codewords or symbols required for processing in GF(256) SCBC 614. It is important to note that the dimension of packet interleaver 612 may changed based on the type and size of memory included. For instance, the first dimension may be changed to columns and the second dimension changed to rows. Additionally other dimensional arrangements may be used.

The GF(256) SCBC 614 is a block code encoder similar to the byte code encoders described previously. In particular, the GF(256) SCBC 614 is implemented using short linear block codes over the Galois Field (256) space. Two constituent block codes may be used. A rate 1/2 block code encoder uses the following generator matrix:

$$G = (1\ 2) \tag{32}$$

The matrix in (32) includes the b element with a value of 2 from equation (2) present in the second column. A rate 2/3 block code encoder uses the following generator matrix:

$$G = \begin{pmatrix} 1 & 0 & 2 \\ 0 & 1 & 2 \end{pmatrix} \tag{33}$$

The generator matrix is formed using an identity matrix and a column of b elements. The third column in matrix (29) includes the b elements from equation (3) with values of 2. Similarly, a rate 1/4 block code encoder uses the following generator matrix:

$$G = (1\ 2\ 2\ 2) \tag{34}$$

The matrix in equation (34) includes the b elements from equations (29), (30), and (31) with a value of 2 located in the second, third and fourth columns. It is important to note that the coefficients in the generator matrix for each constituent code have been optimized based on the relationship of the block code encoding to the entire error correction system and modulation process. Other coefficients may be used. The optimization has especially taken into account the trellis coding and bit to symbol mapping in the 8-VSB modulation because these aspects are the first aspects in the receiving and demodulation process.

The GF(256) SCBC 614 may be either a simple or concatenated block code encoder. A concatenated block code encoder may include other functions such as interleaving and puncturing as described earlier. The GF(256) SCBC 614 may also be capable of encoding multiple encoding rates and may further be capable of switching rate modes through a rate mode controller, not shown. In a preferred embodiment, the GF(256) SCBC 614 may be adapted to encode the incoming stream of data using one of a rate 1/2 constituent code as described in FIG. 1, a rate 12/26 code as described in FIG. 2, or a rate 24/208 code as described in FIG. 4.

The GF(256) SCBC 614 encodes the bytes along the columns outputted from interleaver 612. In other words, the GF(256) SCBC 614 encodes following the second dimension of an interleaver matrix formed through the processing in packet interleaver 612.

The packet deinterleaver 616 receives the encoded stream of codewords produced by the GF(256) SCBC 614 and outputs reconstituted rows of 187-byte packets. Packet deinterleaver 616 inputs the encoded codewords in column by column order, with each column including the redundant or non-systematic bytes added by the processing in the GF(256) SCBC 614, and outputs the bytes in a row by row arrangement. The process is essentially a reverse of the process described for packet interleaver 612 with reversing the order of FIGS. 7 and 8. The packet de-interleaver 612 inputs the same number of columns of codewords, with each codeword now including an encoded set of non-systematic bytes. The number of rows at the output corresponds to the encoded codeword length. For instance, in a 12/26 code rate, 26 rows of packets will be output. It is important to note that the dimension of packet de-interleaver 616 may changed based on the type and size of memory included. Further, the first dimension may be changed to rows and the second dimension changed to columns. Additionally other dimensional arrangements may be used.

The packets may be arranged into two distinct groups. The first group of packets may be referred to as systematic packets and are the same as the original packets of data provided by the transport stream source 602. The second group of packets may be referred to as non-systematic packets and are parity packets formed by the block coding process in the GF(256) SCBC 614. It is important to note that, as a result of the block encoding process, the number of columns (i.e. the size of the second dimension) has been increased.

The MPEG transport stream header modifier 618 receives the deinterleaved 187-byte packets containing groups of systematic and non-systematic packets. As described earlier, each packet contains a 3 byte header. The 3 bytes include a PID, along with several other bits or groups of bits used to convey information regarding the packet. In order to maintain the most efficient operation of receivers capable of receiving the legacy or A53 broadcast signal but not capable of correctly decoding and/or recognizing the ATSC M/H encoded packets (e.g. legacy receivers), certain bits in the headers of a portion of the ATSC M/H packets may be modified. By modifying these bits in the non-systematic packet headers, the legacy receivers should ignore the packets while also not considering the packets as corrupt. For instance, the MPEG transport stream header modifier 618 may set the TEI bit, the payload unit start indicator bit, and the transport priority bit to a bit value of '0'. In addition, the scrambling control and adaptation field bits (2 bits each) may be set to '00'. The continuity counter, 3 bits long, may also be set to '000'. Finally, the PID may be set to a unique and unused value, such as a known value that will be ignored by all legacy receivers. It is important to note that since the MPEG transport stream header modifier 618 will modify each header for the group of non-systematic packets, it may not be necessary for the GF(256) SCBC 614 to process the headers for the group of non-systematic packets. Additionally, the MPEG transport stream header modifier 618 may also modify the headers of the systematic packets if these packets are not to be processed and correctly decoded by a legacy receiver. If the systematic packets are not encoded by the GF(256) SCBC encoder 614 or processed by MPEG transport stream header modifier 618, the resultant stream of data may be simulcast to and received by both mobile devices and legacy receivers.

The a-priori tracking packet inserter 620 may place predetermined tracking packets into the rugged data stream. The predetermined packets represent packets of information that are completely or mostly known to a receiver capable of receiving the rugged data stream, such as the receiver used in a mobile, pedestrian, or handheld device. The predetermined packets are used in the receiver to assist in decoding the trellis state created during the legacy or existing A53 encoding portion of the signal encoding and transmission. The predetermined packets may also assist with convergence in the equalizer portion of the receiver. It is important to note that the predetermined packets are not intended to improve reception in a legacy receiver, but may still result in a potential improvement. Also, unlike conventional training information, the predetermined packets are not directly identifiable at the transmitter output because the predetermined packets are added before additional legacy encoding is performed. In particular, the predetermined packets are altered by the processing of the trellis encoding. As a result, the predetermined packets do not provide direct training during trellis decoding but rather provide a priori branch information used in determining a trellis decoding map or branch.

The predetermined tracking packets may be generated in a number of ways using known training sequence processes. In a preferred embodiment, the predetermined tracking packet includes a valid header with the remaining bytes generated using a pseudo-random number (PN) generator that is also known to the receiver. The predetermined tracking packets, which may also be referred to as a-priori training data, trellis-obscured training data, or pseudo-training packets, may be distributed in some manner throughout the ATSC M/H transmission or may be clustered in a group including placing the packets or groups of packets in a manner that serves as a preamble for the ATSC M/H signal transmission.

The rugged or robust data stream generated in the ATSC M/H block 610 is provided to a mux 630. Mux 630 also receives a legacy data stream from a data source not shown. Note that in some embodiments, the legacy data stream may be provided from MPEG transport stream source 602. Mux 630 may include a buffer memory in order to store portions of the incoming robust ATSC M/H data stream and the legacy data stream. The mux 630 generates the time multiplexing of the rugged ATSC M/H data stream and the legacy data stream together and provides the multiplexed stream to the ATSC A53 legacy block 650.

Mux 630 is controlled by controller 670. Controller 670 may be a separate circuit that is embodied as a microprocessor or microcontroller. Controller 670 may alternatively be included in one of the other blocks such as the MPEG transport stream source 602. Controller 670 may also be incorporated into a controller used for the operation of the entire modulation and transmission apparatus. In addition to providing control for mux 630, controller 670 may also monitor the robust data stream, legacy data stream, or both in order to control the switching of mux 630. Controller 670 may also generate control information associated with the transmission of the robust data stream. The control information may be in the form of one or more packets of control data provided to the MPEG transport stream source 602 or to other stream source blocks. The control information may additionally be provided to other blocks in the encoder, such as the MPEG transport stream header modifier 618, and may be inserted into or included with the robust data stream. Controller 670 may also include control of other operation of the blocks in the encoder 600, such as setting the encoder code rate and a-priori packet insertion.

The legacy ATSC encoder 650 identically encodes the systematic packets and non-systematic packets, provided as a multiplexed data stream, in compliance with the legacy A53 standard. A data randomizer 652 randomizes the packet and provides the packet to Reed-Solomon encoder 654. The Reed-Solomon encoder 654 calculates and concatenates 20 parity bytes to the randomized data to produce a R-S packet that has 207 bytes.

A convolutional interleaver 656 interleaves the R-S packet in order to further randomize the data in time. A trellis encoder 658 encodes the interleaved packet to produce a block of 828 3-bit symbols. The A53 standard specifies the use of 12 trellis encoders, wherein each trellis encoder is a 2/3-rate trellis encoder producing a 3 bit symbol for every two bits present in the interleaved packet. As a result, the trellis encoder 658 includes a de-multiplexer, twelve parallel 2/3-rate trellis encoders, and a multiplexer. Data from the convolutional interleaver 656 is de-multiplexed and distributed to the twelve trellis encoders and the symbols generated by the twelve trellis encoders are multiplexed into stream of symbols.

A sync inserter 660 inserts 4 predefined segment sync symbols at the beginning of each 828-symbol block to create an 832-symbol segment. In addition, the sync inserter 660 inserts a field sync comprising 832 symbols for every 312 segments that are generated. In particular, the field sync symbols precede the 312 segments.

An 8-VSB modulator 662 uses the multiplexed symbols, including the data encoded by the trellis encoder 658, the segment sync symbols, and the field sync to modulate a carrier signal using 8-VSB (vestigial sideband) modulation. Specifically, the 8-VSB modulator 662 generates a pulse amplitude modulated (PAM) signal. The amplitude of the PAM signal will be at one of 8 discrete levels, where each discrete level corresponds to a particular 3 bit symbol. The PAM signal is converted from digital to analog signal format, filtered in order to produce the correct signal pulse shape, and up-converted to radio frequency, using circuitry not shown.

The data generated by a transmission source such as MPEG transport stream source 602 or the source for the legacy content includes video that is source encoded using the motion picture entertainment group (MPEG) 2 format that is also equivalent to International Standards Organization/International Electrotechnical Commission (ISO/IEC) 13818-2 format. The data also includes audio data that is source encoded using Dolby Arc Consistency algorithm #3 (AC-3). The A53 standard also allows the use of metadata for other program elements such as program guide data and such program elements may be source encoded using other methods. In addition, The A53 standard allows transmission of video at a variety of video quality levels and display formats ranging from standard definition interlaced television quality to progressive scan widescreen high definition quality.

The additional functionality of ATSC M/H block 610 to produce a rugged or robust data stream may be added with minimal change to the existing hardware structure of transmission equipment. Additionally, portions of incoming packets from the MPEG transport stream source 602 may be extracted for encoding at one or more of the encoding rates in the ATSC M/H block 510. The encoded packets may then be reinserted in or appended to the remaining unprocessed portion of the input packets using mux 630 under the control of controller 670 and the rugged encoded and unprocessed legacy portions of the stream both encoded in the ATSC A53 legacy encoder 560. Alternately, a separate stream of packets may be provided to the ATSC M/H block 610 and the encoded output inserted in or appended to a second stream of packets and provided to the ATSC A53 legacy encoder 650.

Controller 670 may also include additional processing circuitry in addition to control circuitry for mux 630. Controller 670 may include circuitry for monitoring the rugged and legacy data streams and determining characteristics of the data streams such as the length of a burst of rugged encoded data or the content data rate of the legacy data and data insertion points within the legacy data. Controller 670 may also generate additional control information based on the determined characteristics and provide this additional control information to blocks shown in the encoder, such as the MPEG transport stream header modifier 620, and to other portions of the modulation and transmission apparatus. Controller 670 may also receive information from other portions of the modulation and transmission apparatus and process the information to generate the control information necessary for controlling the mux 630 and other blocks in encoder 600. Controller 670 may also use the received information to generate control information for inclusion in the rugged or robust data stream.

Figure 9:
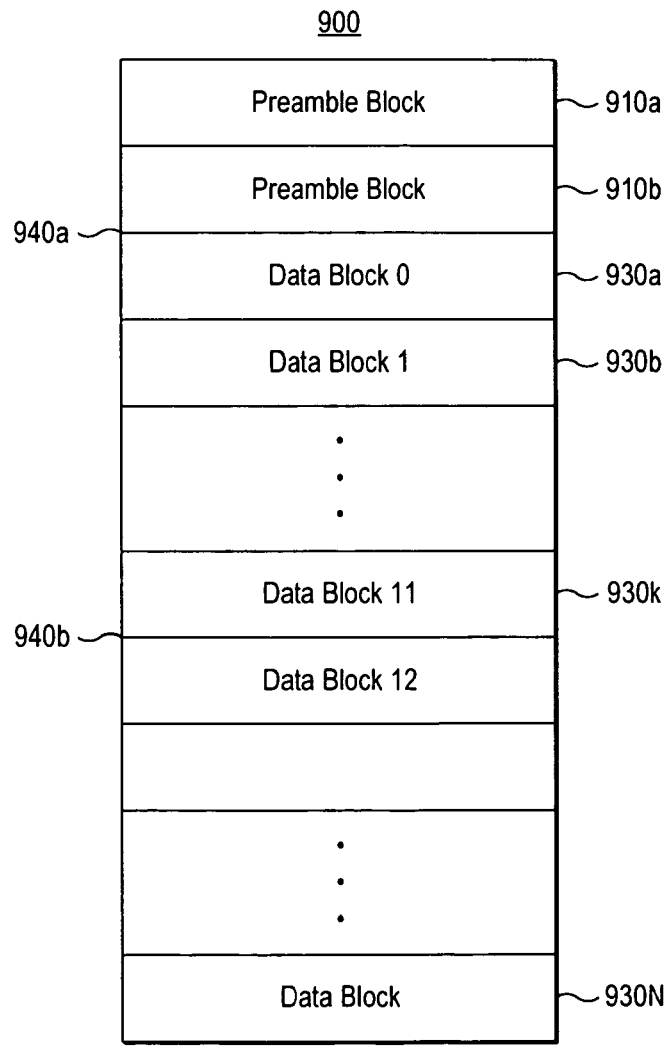
FIG. 9 is a diagram illustrating an arrangement of the encoded data for transmission of the present disclosure.

Turning to FIG. 9, a diagram illustrating an arrangement 900 of data for ATSC mobile data transmission is shown. In arrangement 900, the data is arranged in segments or blocks with each block containing a set of packets of data. In one embodiment, each data block represents 26 packets of data consistent with the arrangement of the packets of data in the ATSC M/H encoder 610. Two preamble blocks 910a and 910b are shown in a temporal location ahead of a field sync 940a that is added in accordance with the legacy A53 standard prior to signal transmission. The preamble blocks 910a and 910b include the a-priori training packets inserted by a-priori tracking packet inserter 620. The presence of the preamble blocks 910a and 910b provide one indication that ATSC mobile data is being transmitted.

A series of data blocks 930a-930N encompassing an ATSC mobile data burst follows the preamble blocks 910a and 910b. The number of data blocks N is variable depending on the desired transmission burst and may be as short as 1 block or may continue on a continual basis for as long as required. Data block 930a, identified as data block 0, may typically contain control information for the current data burst. Data block 930a may contain only control information and may further be referred to as the control block for the mobile data burst. The control information contains parameters needed by the decoder in a receiver for reception of the robust encoded mobile data. The control information is created within the transmission system, either in a data generator, such as data generator 102 in FIG. 1 or in the controller 670 in FIG. 6. The control information may be generated as a valid MPEG packet with valid MPEG Header. An exemplary structure for the control information including defined data bytes is shown in the table below.

TABLE 1

CONTROL INFORMATION

| Syntax | No. of Bits | Format |
|---|---|---|
| Burst_Control_descriptor( ) { | | |
| descriptor_tag | 8 | uimsbf |
| descriptor_length | 8 | uimsbf |
| field number | 16 | uimsbf |
| epoch length | 16 | uimsbf |
| periodic burst type | 8 | uimsbf |
| periodic burst count | 8 | uimsbf |
| burst_number | 8 | uimsbf |
| burst length | 8 | uimsbf |
| rate_mode 12/52 count | 8 | uimsbf |
| rate_mode 12/26 count | 8 | uimsbf |
| rate_mode 17/26 count | 8 | uimsbf |
| rate_mode 24/208 count | 8 | uimsbf |

TABLE 1-continued

CONTROL INFORMATION

| Syntax | No. of Bits | Format |
|---|---|---|
| next periodic burst type | 8 | |
| nextperiodic burst count | 8 | uimsbf |
| next burst_number | 8 | uimsbf |
| burst length | 8 | uimsbf |
| rate_mode 12/52 count | 8 | uimsbf |
| rate_mode 12/26 count | 8 | uimsbf |
| rate_mode 17/26 count | 8 | uimsbf |
| rate_mode 24/208 count | 8 | uimsbf |
| var burst type | 8 | |
| var burst count | 8 | |
| burst_number | 8 | uimsbf |
| burst length | 8 | uimsbf |
| rate_mode 12/52 count | 8 | uimsbf |
| rate_mode 12/26 count | 8 | uimsbf |
| rate_mode 17/26 count | 8 | uimsbf |
| rate_mode 24/208 count | 8 | uimsbf |
| next var burst type | 8 | |
| next_var burst_count | 8 | |
| next burst_number | 8 | uimsbf |
| burst length | 8 | uimsbf |
| rate_mode 12/52 count | 8 | uimsbf |
| rate_mode 12/26 count | 8 | uimsbf |
| rate_mode 17/26 count | 8 | uimsbf |
| rate_mode 24/208 count | 8 | uimsbf |
| extension_flag | 8 | |

The format of the syntax of each of the elements is either unsigned integer most significant bit first (uimsbf) or is predefined and will be further described here. Each of the elements represent a control element used in the transmission of the rugged or robust data stream. The field number is a sequential number to identify the specific field start for an epoch field. The field sync 940b following the control packets in data block 930a is identified as field 1. An epoch is a stream of packets identified with a particular content source or content channel, such as a sports channel or a news channel. Epochs may be repeated and may encompass only a portion of the mobile data burst. The control information additionally allows tracking of epoch length.

The burst_type may be indicated as periodical or variable. For each type, additional parameters are provided. For a periodic burst (value=1), the burst_number is a sequential number to identify the specific burst. For each burst, the number will be incremented by 1 from the previous burst. The burst_number rolls over from 0xFFFF and resumes incrementing at 0x0000. The burst_length identifies the length of the current peiodic burst (in either packets or blocks). Several rate modes may be defined and included along with the length of data at a given encoding rate for the service, such as an epoch. Within the data burst the rate modes are defined as having values:

12/52 rate coding
12/26 rate coding
17/26 rate coding
24/208 rate coding

Each identified rate mode includes a block count value that represents the number of consecutive blocks at the identified rate. It is important to note that the order used for transmitting data blocks using multiple code rates may provide an advantage to the receiving performance in a mobile or handheld receiver. In a preferred embodiment, the data blocks using a code rate 24/208 should be transmitted first. The data blocks using code rate 12/52 should be transmitted second. The data blocks using code rate 17/26 should be transmitted third with the date blocks using code rate 12/26 transmitted last. The control information also includes information for the next, subsequent, or upcoming periodic transmitted burst, defined in next_periodic_burst_type and next_periodic_burst_count as well as the type and length of the encoding rates for the next periodic burst.

Control information for the variable burst is similar to the periodic burst control information. Information is provided for both the current mobile data burst and the next mobile data burst. A next_var_burst_count=0 designates no additional bursts robust data based on the current epoch or service are available.

The extension_flag allows for continuation of control information beyond the length of the current packet. As a result, if the control information exceeds 184 bytes this flag will be 1 and control block will continue in the next 184 byte packet. It is important to note that variations in the order of the information shown in the table may be possible without altering the ability to accurately convey the control information within the packets in data block 930a.

The control packets of information included as part of data block 930a may be generated and transmitted in a number of possible configurations. As described above, the control packets may contain the system information necessary to define the contents of two consecutive ATSC M/H data bursts. Additionally, the control packets may typically have the same coding rate as the data in the remaining 26 packets in data block 930a and the same coding rate as the remaining data blocks in the mobile data burst if only one coding rate is used. Data block 930a may further be encoded with the lowest coding data rate (i.e. the coding rate that transmits the lowest amount of original content data) used within the current mobile data burst, if multiple code rates are used, in order to allow the best reception and decoding opportunity.

The control information described above allows for efficient provisioning of the operation of a mobile or handheld receiver. The control information allows a receiver implementation that saves power when the receiver application only requires a subset of the mobile data multiplex, such as only receiving one service or one epoch out of several available. Further, the control provisions allow the incoming signal to be divided into subset streams, referred to as "virtual streams", which can be independently recovered by the receiver. The power savings and higher operational efficiency result from the time division multiplexing of these virtual streams identified through the control information. For example, the parameters associated with the time division multiplexing of the robust data stream are transmitted to the mobile receiver using the code rate identifiers and epoch identifiers. The mobile receiver recovers and decodes the parameters in the control information allowing the receiver to enter a shutdown or "sleep" mode during time intervals not containing data of interest, resulting in reduced power consumption.

The control block may also contain provisions for establishing and transmitting an absolute time value. The transmission of an absolute time value may allow implementation of features such as a seamless receiving device transition of content delivered from cooperating networks operating with differing network frequencies, transmitting antenna locations, or broadcast transmitting stations.

As described above, the encoder 600 and associated control information includes the flexibility to transmit a data burst as short as one data block or as long as is needed to completely transmit the robust mobile broadcast data. The robust mobile broadcast data burst may approach continuous data transmission, if necessary, significantly reducing the transmission of legacy data for use in legacy receivers. However, a practical problem may be created if proper operation of a legacy receiver must be maintained. Legacy receivers may rely on proper content decoding of incoming received data in order to continue operation without appearing to fail to the viewer. A failure to properly decode and recognize content data may result in the receiver entering a search mode or provide the user with some other undesirable error indication. The occurrence of a significant time period of unrecognizable content data in a legacy receiver due to a long data burst of ATSC mobile data may further create synchronization errors between audio and video display or a buffer underflow in the buffers used to store audio and video content.

In order to address problems introduced by the transmission of long mobile data bursts, a legacy data overlay mode may be introduced. In legacy data overlay mode, one or more data blocks of legacy data are inserted into the mobile data burst. If necessary, multiple data blocks of legacy data may be inserted and legacy data blocks may be inserted on a periodic basis depending of the length of the robust mobile data burst. In one embodiment, data block 930k contains a block of legacy data inserted just prior to the location of field sync 940 in order to maintain synchronization and operation of existing legacy receivers. It is important to note that the frequency of inclusion of legacy data may be imperically determined based on legacy receiver performance. For example, one to two data blocks of legacy data may be inserted between each field sync in the transmission for robust mobile data bursts longer than 24 milliseconds.

In order to identify the legacy data overlay mode, the control block 930a may include information about the use and presence of the legacy overlay mode as well as identifying the one or more data blocks that will contain legacy data. Similar to the information described above, identification of the legacy overlay mode and the location of the legacy data blocks in the control information sent with the mobile data burst allows for more efficient operation and provisioning in a mobile or handheld receiver. Additionally, controller 670 or MPEG transport stream source 602 may monitor the length of the mobile data burst and insert control information to identify the inclusion and location of legacy data blocks. Controller 670 provides a control signal to mux 630 in order to switch the input from the robust mobile data stream to the legacy data stream in order to insert the legacy stream data block. After the legacy stream data block is inserted, mux 630 switch inputs back to the robust mobile data stream. It is important to note that, depending on the length of the robust mobile data burst, more than one portion of the mobile data burst may contain legacy data blocks.

Controller 670 may also control the switching by mux 630 between the robust mobile data stream and the legacy data stream based on monitoring by controller 670 of at least one of the data streams. In one embodiment, controller 670 monitors the data rate of the legacy data stream. As noted earlier, the legacy data stream may include a data rate as high as 19 Mb/sec. However, during certain periods of time, the legacy data rate may be lower. Controller 670 monitor the legacy stream data rate. If the data rate of the legacy data stream is below a predetermined threshold for a period of time, then the controller 670 provides a signal to mux 630 to switch the input from the legacy data stream allowing the insertion of one or more blocks of robust mobile data. A threshold of 10 Mb/sec and a time period of 30 seconds would allow the inclusion of a robust data stream up to 9 Mb/sec (after encoding) during the 30 second interval. As a result, the controller 670 detects the transmitting legacy signal and only allows the transmitting of the robust signal in place of the legacy signal if the data rate of the first signal is below a data rate threshold. The use of time multiplexing control during low legacy data rates may be useful for transmitted robust data to mobile receivers when the robust data is not sensitive to a specific time of delivery.

Figure 10:
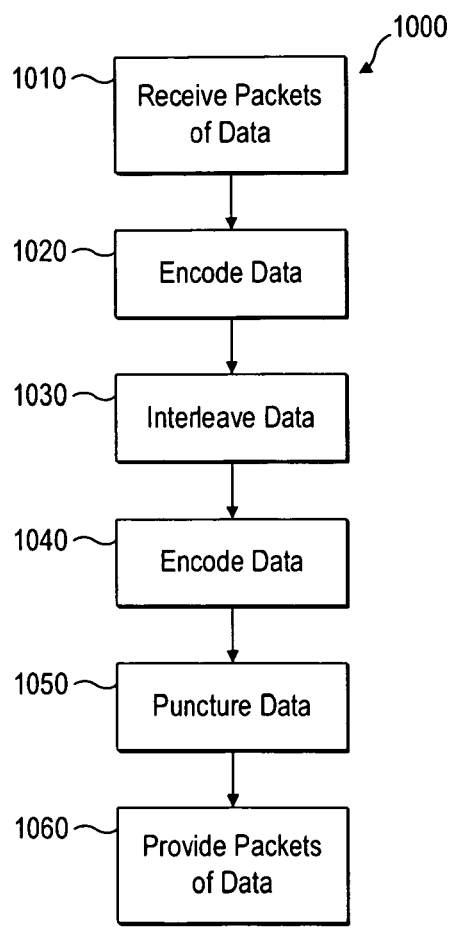
FIG. 10 is a flow chart of an embodiment of an encoding process of the present disclosure.

Turning now to FIG. 10, a flow chart showing an embodiment of an encoding process 1000 is shown. Process 1000 illustrates a concatenated byte-code encoding process that may be used to generate a rugged data stream from an input stream of data. Process 1000 will be primarily described with reference to concatenated byte-code encoder 200 shown in FIG. 2. However, the process could easily be adapted to any byte-code encoder, including the encoder 400 shown in FIG. 4 and described above. It is also important to note that process 1000 may be performed using hardware involving discrete processing blocks or an integrated circuit containing some or all of the necessary blocks, using software operating in a microprocessor device, or a combination of both hardware and software. Additionally, process 1000 will be described with reference to bytes, codewords, and packets of data. However, it should be apparent to one skilled in the art that other data configurations or arrangements are possible and may be used.

First, at step 1010, a stream of data is received. The stream of data may be arranged such that bytes of data may be grouped as codewords and further arranged into packets containing all or portions of one or more codewords. For instance, the data may be arranged in packets containing 187 bytes of data, with each packet containing a packet header used for identification purposes. Next, at step 1020, the packets of data are byte-code encoded. The encoding at step 1020 may be performed using one of the constituent encoders discussed previously. For instance, the encoding step 1020 may use rate 2/3 byte-code encoding that results in outputting 18 bytes of data for every 12 input bytes of data.

Alternately, the encoding step may use another byte-code encoding rate, such as rate 1/2. The encoding step 1020 may use a generator matrix as shown in equations (32) to (34) to supplement the input bytes of data. Supplementing the input data includes creating error creating error correction or redundant data bytes through an encoding process such as a byte code or block code encoding process. The output bytes include duplicates of the 12 input bytes of data, known as systematic bytes, along with 6 bytes of redundant or non-systematic data.

The encoding step 1020 may also include separation or demultiplexing of the codewords. The demultiplexing creates two or more portions of the codewords, allowing separate byte-code encoding of each portion. The separate byte-code encoding may be performed in either a parallel manner or a sequential manner at a higher processing clock speed. The separation or demultiplexing may be used for processing the codewords as described in encoder 400 in FIG. 4.

Figure 3:
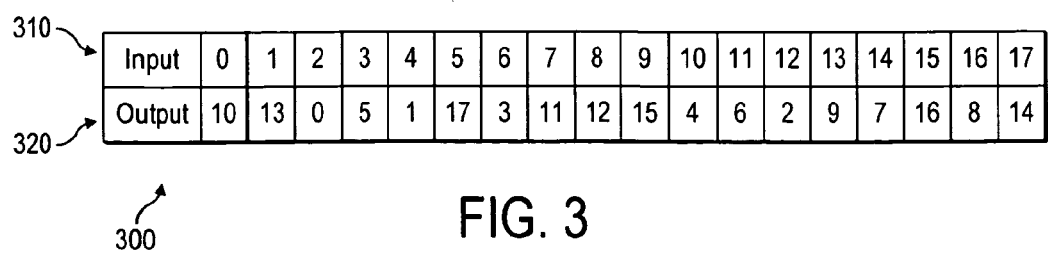
FIG. 3 is a table illustrating a map of data interleaving of the present disclosure.

Next, at step 1030, the encoded data bytes from step 820 are interleaved. Several interleaving arrangements may be used. For instance, an interleaving arrangement as illustrated in FIG. 3. The interleaving arrangement in FIG. 3 provides for a relatively small interleaver size while maximizing the distance of the codes generated in the byte-code encoding step 1020. In other words, the interleaver size may be optimized to reduce the byte error rate in the presence of white noise. Next, at step 1040, the interleaved bytes from step 1030 are byte-code encoded a second time. The second byte-code encoding step 1040 may be performed using one of the constituent encoders discussed previously. For instance, the encoding at step 1020 may use a rate 2/3 byte-code encoding which results in outputting 27 bytes of data for every 18 input bytes of data. Alternately, the encoding step may use another byte-code encoding rate, such as rate 1/2. The encoding step 1040, as above, may use a generator matrix as shown in equations (28) and (28) to supplement the input bytes of data. The output bytes include duplicates of the 18 input bytes of data, known as systematic bytes, along with 8 bytes of redundant or non-systematic data. It should also be apparent that some systematic bytes may be duplicates of one of the bytes of original input data or may be a byte developed as a redundant or non-systematic byte by the first byte-code encoding step 1020.

Next, at step 1050, the second encoded stream of bytes of data is punctured. The puncturing step 1050 removes one of the bytes of data from the second encoded stream. The removed byte may be a non-systematic byte of the second encoding step 1040, and may further be a non-systematic byte also from the first encoding step 1020. Last, at step 1060, the data stream is provided for additional processing, such as legacy or existing A53 encoding. Step 1060 may also include re-packetizing the encoded bytes into packets similar to the arrangement originally received prior to providing the data stream. The process 1000 described results in the generation of a rate 12/26 byte-code encoded data stream.

Puncturing at step 1050 may be removed from process 1000. The choice of the byte for removal is performed based on the interleaving in step 1030. For instance, it may be possible that the second encoding step 1040 may not generate one of the non-systematic bytes as part of its encoding, directly resulting in a punctured stream. Additionally, the puncturing step 1050 may be bypassed to produce an unpunctured rate 12/27 byte-code encoded data stream.

Puncturing at step 1050 may also remove more than 1 byte from the second encoded stream. For instance, it may be possible to identify 3 bytes that may be removed to produce a rate 12/24 byte-code encoded data stream. Puncturing more than one byte will further degrade the effectiveness of the encoding while gaining an improvement in coding rate. Removal of additional bytes in the puncturing step 1050 is achieved based on optimal interleaving at step 1030. In this way the puncturing and interleaving interact to allow an optimal code rate based on producing a given output block size of output packets as described earlier.

It is important to note that steps 1030 and 1040 may be repeated in order to form a different concatenated byte code encoding process including two interleaving steps and three byte-code encoding steps. A process using repeated steps 1030 and 1040 may be used by encoders to generate a rate 12/52 rugged data stream. Further, step 1050 may also include a recombining or multiplexing of two or more parallel portions of codewords in order to form the output data stream. The recombining is used in conjunction with a parallel structure byte-code encoder such as encoder 400 in FIG. 4. Process 1000 may also easily be adapted to other code rates such as those previously described above.

Figure 11:
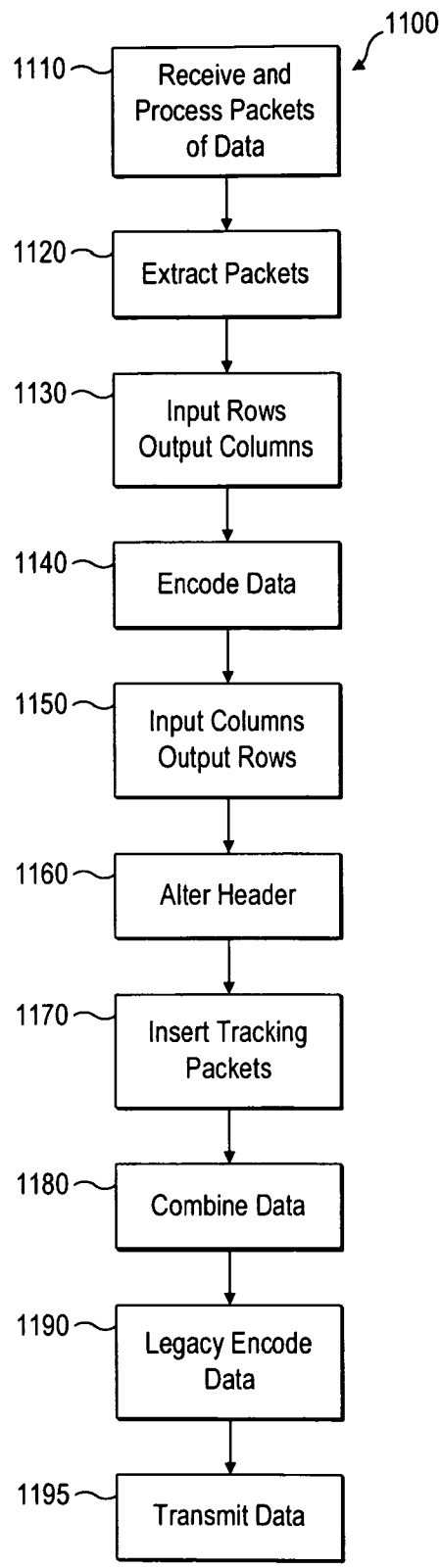
FIG. 11 is a flow chart of another embodiment of an encoding process of the present disclosure.

Turning now to FIG. 11, a flow chart showing another embodiment of an encoding process 1100 is shown. Process 1100 illustrates the steps for encoding and transmitting an ATSC M/H data stream including systematic and non-systematic or redundant data packets that also complies with the existing or legacy A53 signal format. Process 1100 will be described primarily with reference to encoder 600 in FIG. 6. As above, process 1100 may be performed using hardware involving discrete processing blocks or an integrated circuit containing some or all of the necessary blocks, using software operating in a microprocessor device, or a combination of both hardware and software. It is important to note that process 1100 may be adapted by removing or rearranging certain steps based on the exact required implementation.

First, at step 1110, a transport stream of packets is received and processed. Each packet contains 187 bytes and includes a header. The header includes a PID as well as other information regarding the packet. Next, at step 1120 the packets identified as used for ATSC M/H packets are separated or extracted. The remaining packets are identified as unprocessed. It is important to note that the ATSC M/H packets may be provided as a separate input transport stream of packets instead of extracted from a combined single transport stream. Additionally, all packets in the transport stream may be identified as ATSC M/H packets. Either of these conditions may eliminate the need for the extraction step 1120. Further, the packets identified as either ATSC M/H or unprocessed may be grouped and the ATSC M/H identified packets may further be identified and grouped by separate encoding code-rates. In a preferred embodiment, at either step 1110 or 1120, the ATSC M/H packets are grouped into blocks in as arrangement as described in FIG. 9 with the number of packets of data in each block determined based on the coding rate that will be used on the packets.

The processing in step 1110 also includes monitoring the data identified as ATSC M/H packets as well as data packets associated with the legacy data stream. It is important to note that some of the packets in the legacy data stream may also be identified as ATSC M/H packets. The monitoring may include, but is not limited to, content data rate, transport packet rate, time duration of data in the data service, and type of data. Monitoring the data in step 1110 allows determining the identified ATSC M/H packets as well as determining the length of a rugged data stream based on the identified ATSC M/H packets as well as determining the byte-code encoding code rate for the identified ATSC M/H packets. Control information may be generated based on the monitoring and determining in step 1110 and added to the rugged data stream as identified ATSC M/H packets.

Next, at step 1130, the sets or groups of ATSC M/H identified packets are read in or input as rows and output as columns or packet interleaved. The columns of output data are equivalent to codewords with the size of each codeword equal to the size of a group of packets. FIG. 7 and FIG. 8 illustrate the matrices showing the packet interleaving of reading in rows and outputting columns at step 1130. It is important to note that the dimensions of the interleaver used in step 1130 may be changed to, for instance, input columns and output rows or to use any other dimension aspects based on the interleaver implementation. Next, at step 1140, each codeword from step 1130 is block code encoded. The block code encoding at step 1130 is similar to the byte-code encoding in process 1000 and may use either a simple encoding process or a concatenated encoding process. For instance, block code encoding step 1130 may encode the codewords using a rate 1/2 constituent code, a rate 12/26 code, a rate 12/52 code, or a rate 17/26 code.

Next, at step 1150, the set of encoded codewords, are packet-de-interleaved by inputting the codewords as columns and outputting data packets as rows. The input codewords now contain the number of bytes generated by the block code encoding at step 1130. The output packets are reconstituted into packets containing 187 bytes. The non-systematic bytes generated in block code encoding step 1130 constitute additional rows of packets in the encoded stream of data. It is important to note that the dimensions of the de-interleaver used in step 1160 may be changed to, for example. input columns and output rows or to use any other dimension aspects based on the interleaver implementation.

Next, at step 1160, the header bytes in the encoded deinterleaved packets are altered. The altering step at 1160 provides a way to prevent performance issues in receivers not capable of decoding ATSC M/H data packets by preventing the header information from being recognized by a legacy receiver. The altering at step 1160 may include setting the TEI bit, the payload unit start indicator bit, and the transport priority bit to a bit value of '0'. The altering at step 1160 may also include setting the scrambling control and adaptation field bits (2 bits each) to '00'. Altering step 1160 may also include setting the continuity counter, which is 3 bits long, to '000'. Finally, the altering at step 1160 may include setting the PID to a unique and unused value, such as a known value that will be ignored by all legacy receivers. It is important to note that the header bytes may be ignored and not processed in encoding step 1640.

At step 1170, predetermined packets or a-priori tracking packets are inserted into the stream of encoded packets including altered header information. The insertion of a-priori tracking packets improves the performance of a receiver capable of receiving ATSC M/H or mobile video encoded signals. It is important to note that the insertion step 1170 may replace existing redundant or non-systematic packets, or may replace a packet that was originally provided at step 1110 as a null packet in the stream of data packets.

At step 1180, the ATSC M/H encoded packets from step 1170 are combined with the unprocessed portion of the transport stream of data. The ATSC M/H encoded packets may be inserted in, or appended to, the previously identified unprocessed portion of the transport stream of data packets. Alternately, the ATSCH M/H encoded packets from step 1170 may be combined with, inserted in, or appended to, a second transport stream that is identified for legacy broadcast reception only. It is important to note that step 1180 may be also removed if all of the packets at step 1110 were identified and processed as ATSC M/H data packets.

Additionally, at step 1180, the ATSC M/H encoded packets included in a rugged data stream and packets from the second, or legacy only, data stream may be multiplexed based on the monitoring and control information at step 1110. In a preferred embodiment, control information may indicate implementation of a burst mode operation. In the burst mode operation, the legacy broadcast data stream is provided that has a data rate that is below a predetermined data rate allowing additional data to be including in the broadcast transmission. At periodic time intervals based on the predetermined data rate of the legacy broadcast data stream, rugged data stream packets are inserted into the output data stream for transmission.

In another preferred embodiment, control information may indicate implementation of legacy overlay mode operation. In the legacy overlay mode operation, legacy broadcast packets are inserted based on the number of packets continuously provided as ATSC M/H encoded packets and the monitoring and control information determined at step 1110. As described above, control of the insertion step 1110 may be performed by a controller, such as controller 670.

Next, at step 1190, the complete data stream including all packets, ATSC M/H encoded or not, is processed using the legacy or existing encoding compliant with the A53 standard. The legacy encoding at step 1190 includes Reed-Solomon encoding, randomizing, interleaving, trellis encoding and synchronization insertion. The legacy encoding step 1190 may be performed by blocks such as those shown in legacy encoder 650.

Last, at step 1195, the fully encoded data stream, including either all or a portion of the stream encoded as ATSC M/H data, is transmitted. The transmission step 1195 may include transmitting using a specifically identified frequency range and may include transmitting using a wired technology, such as co-axial cable, or transmitting over the airwaves electromagnetically. It is important to note that the ATSC M/H data may be transmitted continuously. In this mode, the ATSC M/H systematic packets also serve as the data packets in a legacy receiver. The non-systematic packets would be ignored. However, separate ATSC M/H and legacy data may be transmitted in a manner that the ATSC M/H data is transmitted periodically, or transmitted continuously for short non-contiguous periods of time.

Figure 12:
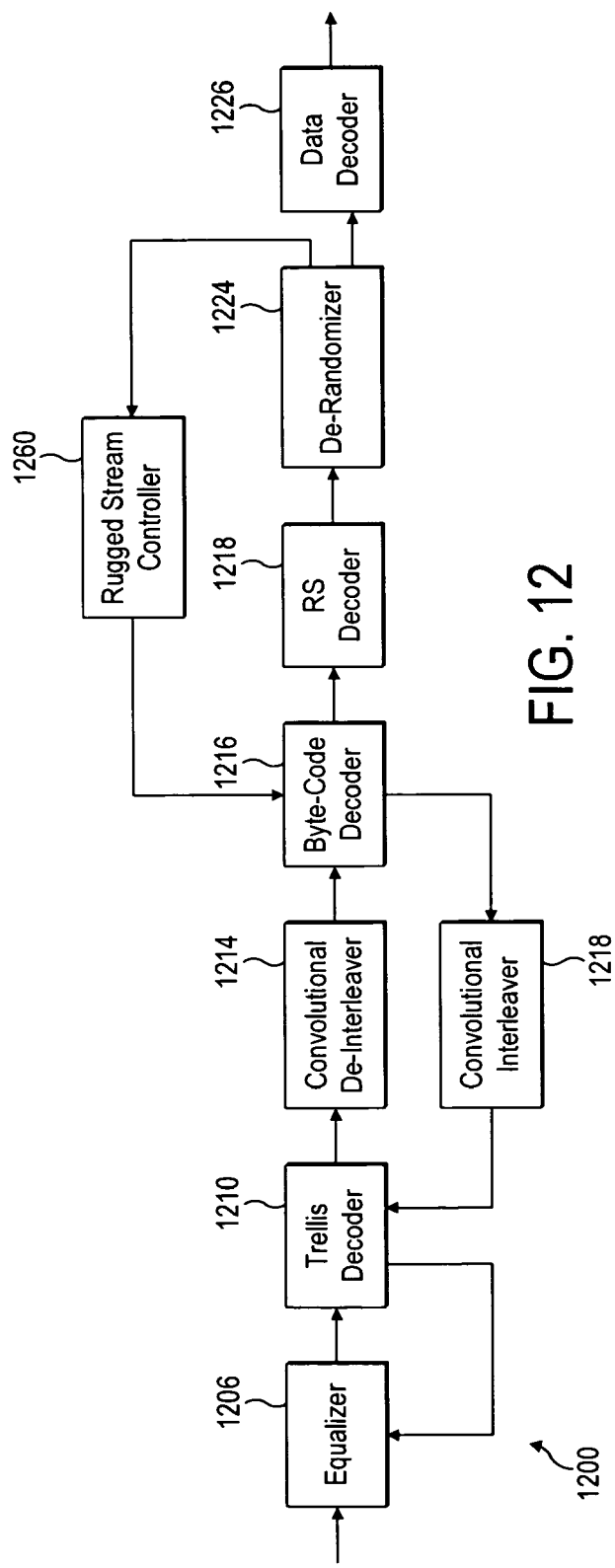
FIG. 12 is a block diagram of an embodiment of a decoder of the present disclosure.

Turning now to FIG. 12, a block diagram of an embodiment of a decoder 1200 used in a receiver is shown. Decoder 1200 includes additional circuitry and processing for receiving and decoding signals that have been adversely affected by transmission of the signal over a transmission medium such as electromagnetic waves over the air. Decoder 1200 is capable of decoding both a rugged data stream as well as a legacy data stream. For example, decoder 1200 may be included in a receiver capable of receiving and decoding a signal transmitted as an ATSC M/H signal.

In decoder 1200, the incoming signal, following initial processing, is provided to equalizer 1206. Equalizer 1206 is connected to trellis decoder 1210, which provides two outputs. A first output from trellis decoder 1210 provides feedback and is connected back as a feedback input to equalizer 1206. The second output from trellis decoder 1210 is connected to a convolutional de-interleaver 1214. The convolutional de-interleaver 1214 is connected to a byte-code decoder 1216, which also provides two outputs. A first output from byte-code decoder 1216 is connected back as a feedback input to trellis decoder 1210 through a convolutional interleaver 1218. The second output from byte-code decoder 1216 is connected to a Reed-Solomon decoder 1220. The output of the Reed-Solomon decoder 1220 is connected to de-randomizer 1224. The output of the de-randomizer 1224 is connected to a data decoder 1226. A rugged stream controller 1260 is connected to the byte-code decoder 1216 and de-randomizer 1224. It is important to note that Reed-Solomon decoder 1220, de-randomizer 1224, and data decoder 1226 are connected, and functionally operate, in a manner similar to those blocks in a conventional receiver used for receiving ATSC A53 legacy broadcast signals.

An input signal from the front end processing (e.g. antenna, tuner, demodulator, A/D converter) of the receiver (not shown) is provided to equalizer 1206. Equalizer 1206 processes the received signal to completely or partially remove the transmission channel effect in an attempt to recover the received signal. The various removal or equalization methods are well known to those skilled in the art and will not be discussed here. Equalizer 1206 may include multiple sections of processing circuitry including a feed-forward equalizer (FFE) section and a decision-feedback-equalizer (DFE) section.

The equalized signal is provided to trellis decoder 1210. The trellis decoder 1210 produces, as one output, a set of decision values that are provided to the DFE section of equalizer 1206. The trellis decoder 1210 may also generate intermediate decision values that are also provided to the DFE section of equalizer 1206. The DFE section uses the decision values along with intermediate decision values from the trellis decoder 1210 to adjust values of filter taps in equalizer 1206. The adjusted filter tap values cancel interference and signal reflections that are present in the received signal. The iterative process allows equalizer 1206, with the assistance of feedback from trellis decoder 1210, to dynamically adjust to a potential changing signal transmission environment conditions over time. It is important to note that the iterative process may occur at a rate similar to incoming data rate of the signal, such as 19 Mb/s for a digital television broadcast signal. The iterative process also may occur at a rate higher than the incoming data rate.

The trellis decoder 1210 also provides a trellis decoded data stream to convolutional de-interleaver 1214. Convolutional de-interleaver 1214 operates similar to the de-interleaver described in FIG. 20 generates de-interleaved bytes organized within data packets. The data packets are provided to byte-code decoder 1216. As described above, packets that are not a part of a rugged data stream are simply passed through the byte-code decoder 1216 to Reed-Solomon decoder 1220. For the packets identified as part of a rugged data stream, the byte-code decoder 1216 uses the redundant information in the non-systematic packets to initially decode the bytes in the packets as described above. It is important to note that initial decoding of all receiving packets may be performed prior to the time that any identification is completed.

Byte-code decoder 1216 and the trellis decoder 1210 operate in an iterative manner, referred to as a turbo-decoder, to decode the rugged data stream. Specifically, the trellis decoder 1210 provides, after de-interleaving by convolutional de-interleaver 1214, a first soft decision vector to the byte-code decoder 1216 for each byte of the packets that are included in the rugged data stream. Typically, the trellis decoder 1210 produces the soft decision as a vector of probability values. In some embodiments, each probability value in the vector is associated with a value that the byte associated with the vector may have. In other embodiments, the vector of probability values is generated for every half-nibble (i.e., two bits) that is contained in the systematic packet because the 2/3-rate trellis decoder estimates two-bit symbols. In some embodiments the trellis decoder 1210 combines four soft decisions associated with four half-nibbles of a byte to produce one soft-decision that is a vector of the probabilities of values that the byte may have. In such embodiments, the soft-decisions corresponding to the byte is provided to the byte-code decoder 1216. In other embodiments, the byte-code decoder separates a soft-decision regarding a byte of the systematic packet into four soft-decision vectors, wherein each of the four soft-decisions is associated with a half-nibble of the byte.

The byte-code decoder 1216 uses the soft decision vector associated with the bytes comprising packets of the rugged data stream to produce a first estimate of the bytes that comprise the packets. The byte-code decoder 616 uses both the systematic and the non-systematic packets to generate a second soft decision vector for each byte of packets comprising the rugged stream and provides the second soft-decision vector to the trellis decoder 1210, after re-interleaving by convolutional interleaver 1218. The trellis decoder 1210 thereafter uses the second soft-decision vector to produce a further iteration of the first decision vector, which is provided to the byte-code decoder 1216. The trellis decoder 1210 and the byte-code decoder 1216 iterate in this fashion until the soft-decision vector produced by the trellis decoder and byte-code decoder converge or a predetermined number of iterations are undertaken. Thereafter, the byte-code decoder 1216 uses the probability values in the soft-decision vector for each byte of the systematic packets to generate a hard decision for each byte of the systematic packets. The hard decision values (i.e., decoded bytes) are output from the byte-code encoder 1216 to Reed-Solomon decoder 1220. The trellis decoder 1210 may be implemented using a Maximum a Posteriori (MAP) decoder and may operate on either byte or half-nibble (symbol) soft decisions.

It is important to note that turbo-decoding typically utilizes iteration rates related to passing decision data between blocks that are higher than the incoming data rates. The number of possible iterations is limited to the ratio of the data rate and the iteration rate. As a result and to the extent practical, a higher iteration rate in the turbo-decoder generally improves the error correction results. In one embodiment, an iteration rate that is 8 times the incoming data rate may be used.

A soft input soft output byte-code decoder such as described in FIG. 12 may include vector decoding functions. Vector decoding involves grouping bytes of the data including systematic and non-systematic bytes. For example, for a rate 1/2 byte code encoded stream, 1 systematic and 1 non-systematic byte will be grouped. The two bytes have over 64,000 possible values. The vector decoder determines or estimates a probability for each of the possible values of the two bytes and creates a probability map. A soft decision is made based on a weighting the probabilities of some or all of the possibilities and the Euclidean distance to a possible codeword. A hard decision may be made when the error of the Euclidean distance falls below a threshold.

The hard or soft decision output of the byte-code decoder 1218 is provided to Reed-Solomon decoder 1220. The Reed-Solomon decoder 1220 forms the output data into packets of, for instance, 207 bytes. The Reed-Solomon decoder 1220 considers each sequence of 207 bytes produced by the byte-code decoder as one or more Reed-Solomon codewords and determines if any bytes in the codewords or packets were corrupted due to an error during transmission. The determination is often performed by calculating and evaluating a set of syndromes or error patterns for the codewords. If corruption is detected, the Reed-Solomon decoder 1220 attempts to recover the corrupted bytes using the information encoded in the parity bytes. The resulting error-corrected data stream is then de-randomized by a de-randomizer 1224 and thereafter provided to a data decoder 1226 that decodes the data stream in accordance with the type of content being transmitted.

The data decoder 1224 uses an identifier, such as the PID, in the header of the decoded packet to determine the type of information carried in the packet and how to decode such information. The PID in the header is compared to information in a Program Map Table (PMT) that may be periodically transmitted as part of the data stream and updated in the receiver.

The data decoder 1224 ignores any packet that has a PID for data packets that are not of a recognized type.

Rugged stream controller 1260 also receives the de-randomized data stream. Rugged stream controller 1260 may be a separate circuit that is embodied as a microprocessor or microcontroller. Rugged stream controller 1260 may alternatively be included in one of the other blocks such as the byte-code decoder 1216. Rugged stream controller 1260 may also be incorporated into a controller used for the operation of the entire receiving apparatus. Rugged stream controller 1260 may determine the presence of a-priori transport packets, for instance, in the form of a preamble used for the rugged data stream. Based on the presence of the a-priori transport packets, rugged stream controller 1260 identifies and decodes control information in the rugged data stream. In a preferred embodiment, after rugged stream controller 1260 identifies the preamble data blocks in the rugged data stream, rugged stream controller decodes the control packets in a first data block.

Using the identified control information, the rugged stream controller 1260 provides control signals to the byte-code decoder 1216. The control signals may include information to set the decoding rate and to indicate the number of codewords, packets, or blocks of data to be decoded. Rugged stream controller 1260 may also provide control signals indicating whether certain received codewords, packets, or blocks of data that can be ignored as legacy data based on transmission of the rugged data stream in conjunction with a legacy data stream in either a burst mode operation or legacy overlay mode operation as described earlier. In one preferred embodiment, rugged stream controller 1260 uses the control information to identify blocks of rugged data and alters the operation byte-code decoder in a way that allows blocks not associated with the rugged stream to pass through the byte-code decoder unprocessed. In another embodiment, rugged stream controller 1260 commands the byte-code decoder 1216 to shut down during identified time periods between mobile data bursts. Rugged stream controller 1260 may also provide signals to other blocks in decoder 1200 and to other portions of the receiver for allowing the receiver to shutdown based on the control information.

Decoders, as described in FIG. 12 may decode a rugged data stream that has been encoded by the byte-code encoders described earlier, including encoding by simple byte-code encoders or concatenated byte-code encoders. The decoder in FIG. 12 describes decoding a rugged data stream encoded by a simple or constituent byte-code encoder involving only a single encoding step. Concatenated byte-code decoding includes decoding the incoming codewords or bytes in more than one decoding step in addition to intermediate processing such as de-interleaving, de-puncturing, and re-insertion.

Figure 13:
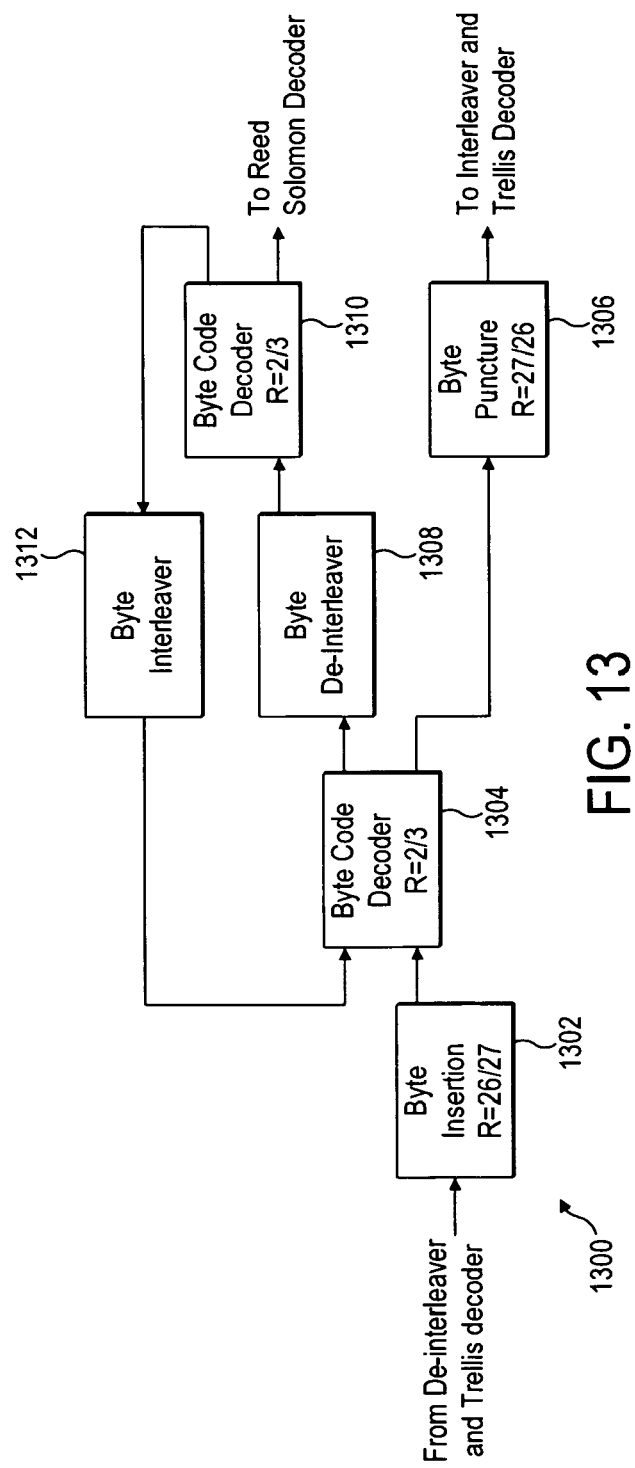
FIG. 13 is a block diagram of an embodiment of a concatenated byte-code decoder of the present disclosure.

Turning now to FIG. 13, a block diagram of an embodiment of a concatenated byte-code decoder 1300 is shown. Concatenated byte-code decoder 1300 is configured to operate in a turbo-decoder configuration such as shown in FIG. 21. Concatenated byte-code decoder 1300 also operates internally as a turbo-decoder using an iterative process to decode concatenated byte-code encoded packets in a rugged data stream. Concatenated byte-code decoder 1300 is adapted to decode a rate 12/26 byte-code encoded signal stream, producing 12 bytes of data from an originally encoded 26 bytes.

The data stream, representing soft decision values of the 26 bytes is provided to a byte insertion block 1302. The output of the byte insertion block 1302 is connected to a first 2/3 rate byte-code decoder 1304. The first 2/3 rate byte-code decoder 1304 provides two outputs. A first output is connected to a puncture block 1306, with the output of the puncture block connected as a feedback input to a trellis decoder through an interleaver as shown in FIG. 21. The second output of the first 2/3 rate byte-code decoder 1304 is connected to a de-interleaver 1308. The output of the symbol de-interleaver 1308 is connected to a second 2/3 rate decoder 1310 also having two outputs. A first output is connected as a feedback input to the first 2/3 rate byte-code decoder 1304 through an interleaver 1312. The second output is connected to other processing blocks such as a Reed-Solomon decoder.

The 26 byte input to byte insertion block 1302 includes the first soft-decisions generated by a trellis decoder, such as trellis decoder 2110 in FIG. 21 regarding the systematic bytes of data or systematic packets and soft-decisions regarding the non-systematic bytes of data or non-systematic packets. The systematic and non-systematic bytes of data may be from packets that have been byte-code encoded. A 2/3 rate byte-code decoder requires 3 bytes in order to decode 2 data bytes. However, the original concatenated encoding removed a byte to reduce the codeword from 27 bytes to 26 bytes by removing, preferably, a non-systematic byte. As a result, a byte is needed to replace the byte removed by the puncturing in the encoding process. Additionally, the trellis decoder does not generate any soft-decisions regarding the punctured byte in the data stream because the input stream to the trellis decoder did not contain the byte. As a result, a soft-decision value is inserted indicating that the value of the punctured byte is equally probable. The first soft-decisions, including the inserted soft-decision value from byte insertion block 1302, are provided to first 2/3 rate byte-code decoder 1304. The first 2/3 rate byte-code decoder 1304 uses the first soft-decisions to generate second soft-decisions based on decoding the bytes of the systematic and non-systematic packets. The generation of the soft decisions utilizes, for instance, the multiplication of a set of bytes by the inverse of the values of the $b_1$ and $b_2$ elements that were used to develop the byte-coded packet as shown in equation (2) and (3) above.

A 27 byte soft output from first 2/3 rate byte-code decoder is provided to puncture block 1306. The 27 byte soft output represents an updated set of soft decision values for both the systematic and non-systematic bytes following the decoding in the first 2/3 rate byte-code decoder. Puncture block 1306 removes the previously inserted soft decision byte in order to return the byte format to the 26 byte format originally processed by the trellis decoder.

An 18 byte soft output from the first 2/3 rate byte-code decoder representing only systematic bytes is provided to de-interleaver 1308. De-interleaver 1308 deinterleaves the 18 bytes of data in a manner reversing the interleaving that was performed in the 2/3 rate byte-code encoding process. De-interleaver 1306 exactly reverses the interleaving map in the encoder by, for instance, reversing rows 710 and 720 in FIG. 7.

The de-interleaved bytes are provided to the second 2/3 rate byte-code decoder 1310. The second 2/3 rate byte-code decoder 1310 uses the de-interleaved soft decision systematic bytes to generate two additional outputs of soft decision bytes in a manner similar to that described above. An 18 byte soft output is provided to interleaver 1312. The 18 byte soft output represents an updated set of soft decision values for both the systematic and non-systematic bytes from the decoding in the first 2/3 rate byte-code decoder 1304. Interleaver 1312 re-interleaves the de-interleaved bytes in order to place them back into the byte format used by the first 2/3 rate byte-code decoder. Interleaver 1312 is essentially identical to the interleaver used in an encoder, such as interleaver 604 in FIG. 6 and provides a re-interleaved set of 18 bytes to the first 2/3 byte-code decoder 1304. The re-interleaved set of 18 bytes are used to improve soft decisions made by the first 2/3 rate byte-code decoder 1304.

A 12 byte output from the second 2/3 rate byte-code decoder 1310 represents the systematic bytes decoded data output for a 12/26 rate byte-code encoded rugged data stream. If the soft-decisions for the 12 systematic output bytes generated by the second 2/3 rate byte-code decoder 1310 are conclusive or within a predetermined threshold of being conclusive as correct data values, then the second 2/3 rate byte-code decoder 1310 uses the soft-decisions to generate hard-decisions regarding the 12 output bytes and provides the 12 output bytes to further processing blocks such as a Reed-Solomon decoder. However, if the soft-decisions generated by the second 2/3 rate byte-code decoder are not conclusive, further iterations are developed as above, using soft information developed and fed back during the previous iteration. This additional soft information is provided to each soft decoder by its succeeding decoder. That is, a trellis decoder uses feedback from first 2/3 rate byte-code decoder 1304 provided through puncture block 1306, and first 2/3 rate byte-code decoder 1304 uses feedback from the second 2/3 rate byte-code decoder 1310 provided through interleaver 1312. The iterations continue in this manner until the soft decisions generated by the second 2/3 rate byte-code decoder 1310 sufficiently converge or until a predetermined number of iterations has been undertaken. As above, the turbo-decoding used in typically utilizes iteration rates related to passing decision data between blocks that are higher than the incoming data rates.

It is important to note that in a preferred encoder, such as encoder 200 shown in FIG. 2, byte-code encoding precedes the Reed-Solomon encoding of data packets. However, in decoder 1300 shown here, the incoming data is byte-code decoded before being the Reed-Solomon decoded. The re-ordering is possible because both the byte-code operation and Reed-Solomon code operation are linear over the Galois Field (256) used in the A53 standard, and linear operators are commutative in a Galois Field. The re-ordering is important because the byte-code encoding provides higher reliability for recovering errors in the received signal. Additionally, the byte-code encoding may be decoded using a soft decision algorithm and further may be included in an iterative decoding process with the trellis decoding. Reed-Solomon decoding operates primarily as hard decision decoding and does not improve performance using soft decision decoding. As a result, performing byte-code decoding prior to Reed-Solomon decoding results in improved receiver performance as measured in terms of bit-error rate and signal to noise ratio.

Additionally, as with the description of the embodiments of encoder 100 in FIG. 1 and encoder 600 in FIG. 6, it should be noted that other embodiments of the byte-code decoder may be used for decoding other coding rates. For instance, constituent byte-code decoders for rate 1/2 and rate 2/3 code rates may be included and inserted in place of the rate 2/3 constituent byte-code decoder in order to decode other decoding rates. Further additional blocks may be included to allow for parallel decoding or sequential high speed decoding as may be necessary for decoding a rate 24/208 byte-code encoded signal as described in FIG. 4. It should also be noted that the byte code decoding elements and processes may be added to the elements, components, and circuits needed and used in a legacy receiver with minimal change to the legacy receiver. However, the decoding process may be enhanced by incorporating features of the byte code decoding process into other blocks in the legacy receiver.

The various systems using arrangements of byte-code encoding and decoding described above allow an expansion of the applications of the existing or legacy broadcast system. First, existing legacy receivers may benefit from the additional presence of packets encoded using ATSC M/H. The more robust SCBC encoded packets and the a-priori tracking packets may be processed by the trellis decoder and equalizer to improve tracking in dynamic signal environment conditions. Second, the ATSC M/H encoded data that creates a robust or rugged data that allow receiving systems in mobile, handheld, and pedestrian devices to receive the robust stream in signal environments that the legacy A53 transmission cannot be received. For instance, ATSC M/H encoding at rate 24/208 allows signal reception at a white noise threshold equal to 2.0 decibels (dB) as compared a white noise threshold of around 15 dB for legacy A53 reception. Operation is further enhanced by generating the ATSC M/H packets and transmitting the packets in a periodic manner along with the legacy A53 data. The periodic transmission is important to permit video and audio delivery of broadcast material. The ATSC M/H packets may also be grouped and transmitted as a one or more transmission bursts. Transmission in bursts is important for delivery of data content or content that may be stored for later use by the mobile, handheld, or pedestrian device.

While the embodiments may be susceptible to various modifications and alternative forms, specific embodiments have been shown by way of example in the drawings and have been described in detail herein. However, it should be understood that the disclosure is not intended to be limited to the particular forms disclosed. Rather, the disclosure is to cover all modifications, equivalents and alternatives falling within the spirit and scope of the disclosure as defined by the following appended claims.

What is claimed is:

1. A method comprising the steps of:
encoding a first set of data blocks, the first set of data blocks representing mobile broadcast data encoded for use by a first type of receiver capable of decoding and recognizing the first set of data blocks;
determining a data length for the first set of encoded data blocks, wherein the data length is identified in either packets or blocks; and
inserting at least one data block from a second set of data blocks within the first set of encoded data blocks at a location prior to a field sync if the data length is greater than a data length threshold, the second set of data blocks representing a legacy broadcast television transmission signal encoded for use by a second type of receiver capable of decoding and recognizing the second set of data blocks and not capable of decoding and recognizing the first set of data blocks, and wherein the data length threshold and location for the inserting of the at least one data block is determined based on preventing synchronization errors in the second type of receiver while decoding the second set of data blocks during a time of receiving the first set of data blocks and wherein the first set of encoded data blocks is encoded to prevent the second type of receiver from interpreting the first set of encoded data as corrupted data.

2. The method of claim 1, further comprising the steps of:
encoding the first set of data blocks including the at least one data block using a second encoding process; and
transmitting the second encoded set of data blocks.

3. The method of claim 1, wherein the step of encoding includes byte-code encoding the first set of data blocks.

4. An apparatus comprising:
means for encoding a first set of data blocks, the first set of data blocks representing mobile broadcast data encoded for use by a first type of receiver capable of decoding and recognizing the first set of data blocks;
means for determining a data length for the first set of encoded data blocks, wherein the data length is identified in either packets or blocks; and
means for inserting at least one data block from a second set of data blocks within the first set of encoded data blocks at a location prior to a field sync if the data length is greater than a data length threshold, the second set of data blocks representing a legacy broadcast television transmission signal encoded for use by a second type of receiver capable of decoding and recognizing the second set of data blocks and not capable of decoding and recognizing the first set of data blocks, and wherein the data length threshold and location for the inserting of the at least one data block is determined based on preventing synchronization errors in the second type of receiver while decoding the second set of data blocks during a time of receiving the first set of data blocks and wherein the first set of encoded data blocks is encoded to prevent the second type of receiver from interpreting the first set of encoded data as corrupted data.

5. An apparatus comprising:
an encoder that encodes a first set of data blocks, the first set of data blocks representing mobile broadcast data encoded for use by a first type of receiver capable of decoding and recognizing the first set of data blocks;
a controller coupled to the encoder, the controller determining a data length for the first set of encoded data blocks, wherein the data length is identified in either packets or blocks; and
a multiplexer coupled to the controller, the multiplexer inserting at least one data block from a second set of data blocks within the first set of encoded data blocks at a location prior to a field sync if the data length is greater than a data length threshold, the second set of data blocks representing a legacy broadcast television transmission signal encoded for use by a second type of receiver capable of decoding and recognizing the second set of data blocks and not capable of decoding and recognizing the first set of data blocks;
wherein the data length threshold and location for the inserting of the at least one data block is determined based on preventing synchronization errors in the second type of receiver while decoding the second set of data blocks during a time of receiving the first set of data blocks and wherein the first set of encoded data blocks is encoded to prevent the second type of receiver from interpreting the first set of encoded data as corrupted data.

* * * * *